(12) United States Patent
Seery et al.

(10) Patent No.: US 8,615,939 B2
(45) Date of Patent: Dec. 31, 2013

(54) PHOTOVOLTAIC MODULE MOUNTING SYSTEM

(75) Inventors: Martin N. Seery, San Rafael, CA (US); Rodney H. Holland, Novato, CA (US); Jeff Hartnett, Fairfax, CA (US); Isaac Childress, San Anselmo, CA (US); Todd Pelman, San Francisco, CA (US)

(73) Assignee: SunLink Corporation, San Rafael, CA (US)

( * ) Notice: Subject to any disclaimer, the term of this patent is extended or adjusted under 35 U.S.C. 154(b) by 129 days.

(21) Appl. No.: 13/317,142

(22) Filed: Oct. 11, 2011

(65) Prior Publication Data

US 2012/0061337 A1 Mar. 15, 2012

Related U.S. Application Data

(63) Continuation-in-part of application No. 12/587,970, filed on Oct. 15, 2009, now Pat. No. 8,156,697.

(51) Int. Cl.
*E04D 13/18* (2006.01)
(52) U.S. Cl.
USPC .......................... 52/173.3; 136/244; 126/623
(58) Field of Classification Search
USPC .......... 52/173.3; 136/251, 244, 291; 257/433; 126/621, 622, 623
See application file for complete search history.

(56) References Cited

U.S. PATENT DOCUMENTS

| | | |
|---|---|---|
| 3,947,138 A | 3/1976 | Eshelman |
| 5,205,072 A | 4/1993 | Eutebach |
| 5,356,675 A | 10/1994 | Unger et al. .................... 428/34 |
| 5,588,181 A | 12/1996 | Sutton |
| 5,732,180 A | 3/1998 | Kaplan |
| 5,746,839 A | 5/1998 | Dinwoodie |
| 5,867,869 A | 2/1999 | Garrett et al. .................. 16/252 |
| 6,063,996 A | 5/2000 | Takada et al. |
| 6,099,097 A | 8/2000 | Hocker et al. ................ 312/327 |
| 6,481,055 B2 | 11/2002 | Cheng ............................ 16/252 |
| 6,560,821 B2 | 5/2003 | Miller et al. |
| 6,570,084 B2 | 5/2003 | Dinwoodie |
| 6,766,561 B1 | 7/2004 | Cheng ............................ 16/235 |
| 6,809,251 B2 | 10/2004 | Dinwoodie |
| 6,968,654 B2 | 11/2005 | Moulder et al. |
| 7,114,292 B2 | 10/2006 | Chiang ........................... 49/388 |
| 7,188,390 B2 | 3/2007 | Cheng ............................ 16/252 |
| 7,240,400 B2 | 7/2007 | Bonham |
| 7,305,797 B2 | 12/2007 | Chiang |
| 2003/0000569 A1 | 1/2003 | Zwanenburg |
| 2003/0070368 A1 | 4/2003 | Shingleton |
| 2003/0098056 A1 | 5/2003 | Fronek et al. |
| 2004/0250491 A1 | 12/2004 | Diaz et al. |
| 2005/0005534 A1 | 1/2005 | Nomura et al. |
| 2005/0115176 A1 | 6/2005 | Russell |
| 2006/0053706 A1 | 3/2006 | Russell |
| 2006/0118163 A1 | 6/2006 | Plaisted et al. |
| 2006/0288645 A1 | 12/2006 | Konstantino et al. |
| 2007/0120381 A1 | 5/2007 | Ehrensvard et al. ...... 292/307 R |
| 2008/0083087 A1 | 4/2008 | Lin |
| 2009/0199846 A1* | 8/2009 | Collins et al. ................. 126/601 |

* cited by examiner

*Primary Examiner* — William Gilbert

(74) *Attorney, Agent, or Firm* — Reed Smith LLP

(57) ABSTRACT

A photovoltaic module mounting system using clamps to attach the modules to a mounting structure, thereby providing a universal mounting structure for use with laminate or framed modules of differing shapes and sizes, from different manufacturers.

13 Claims, 37 Drawing Sheets

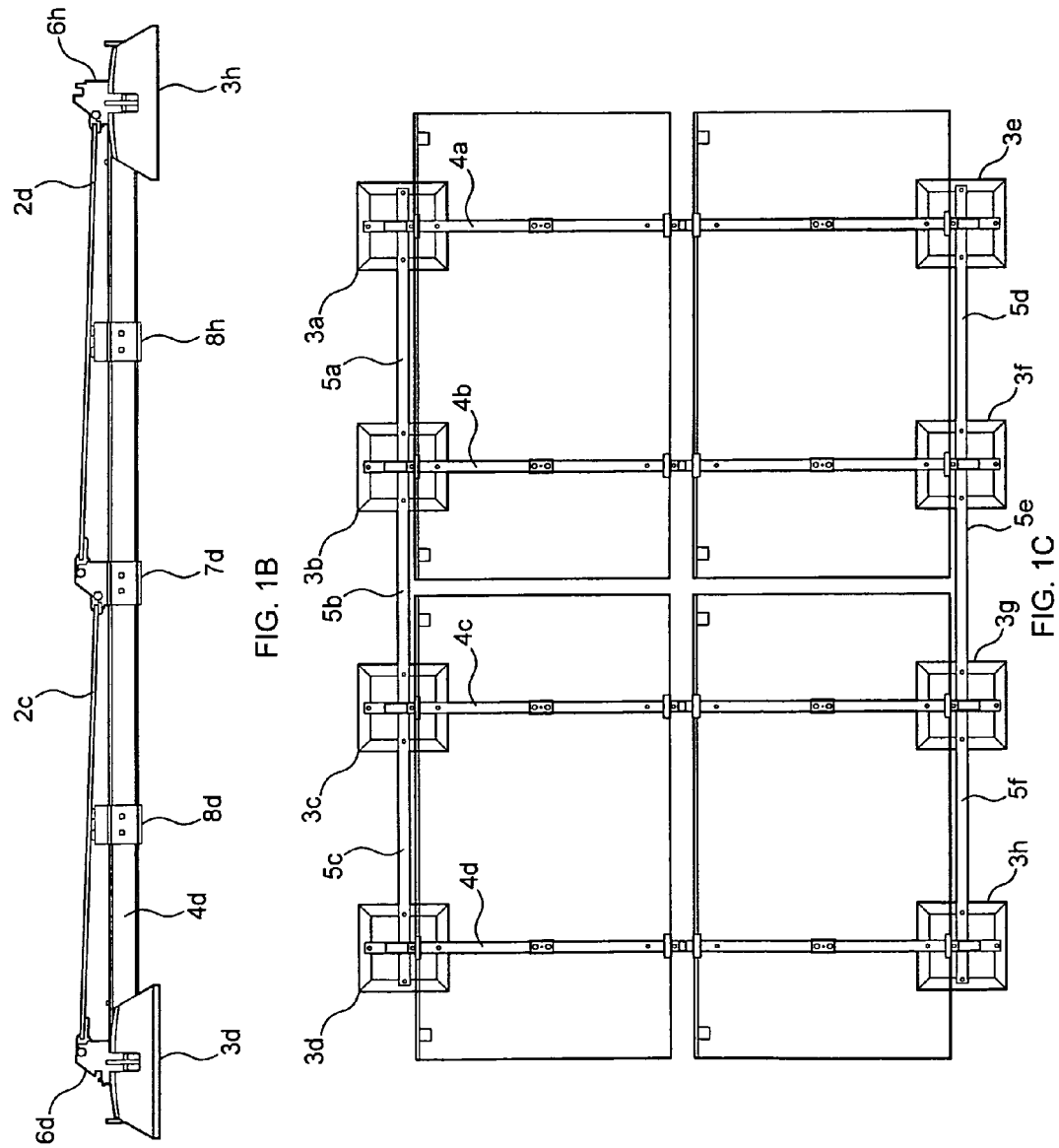

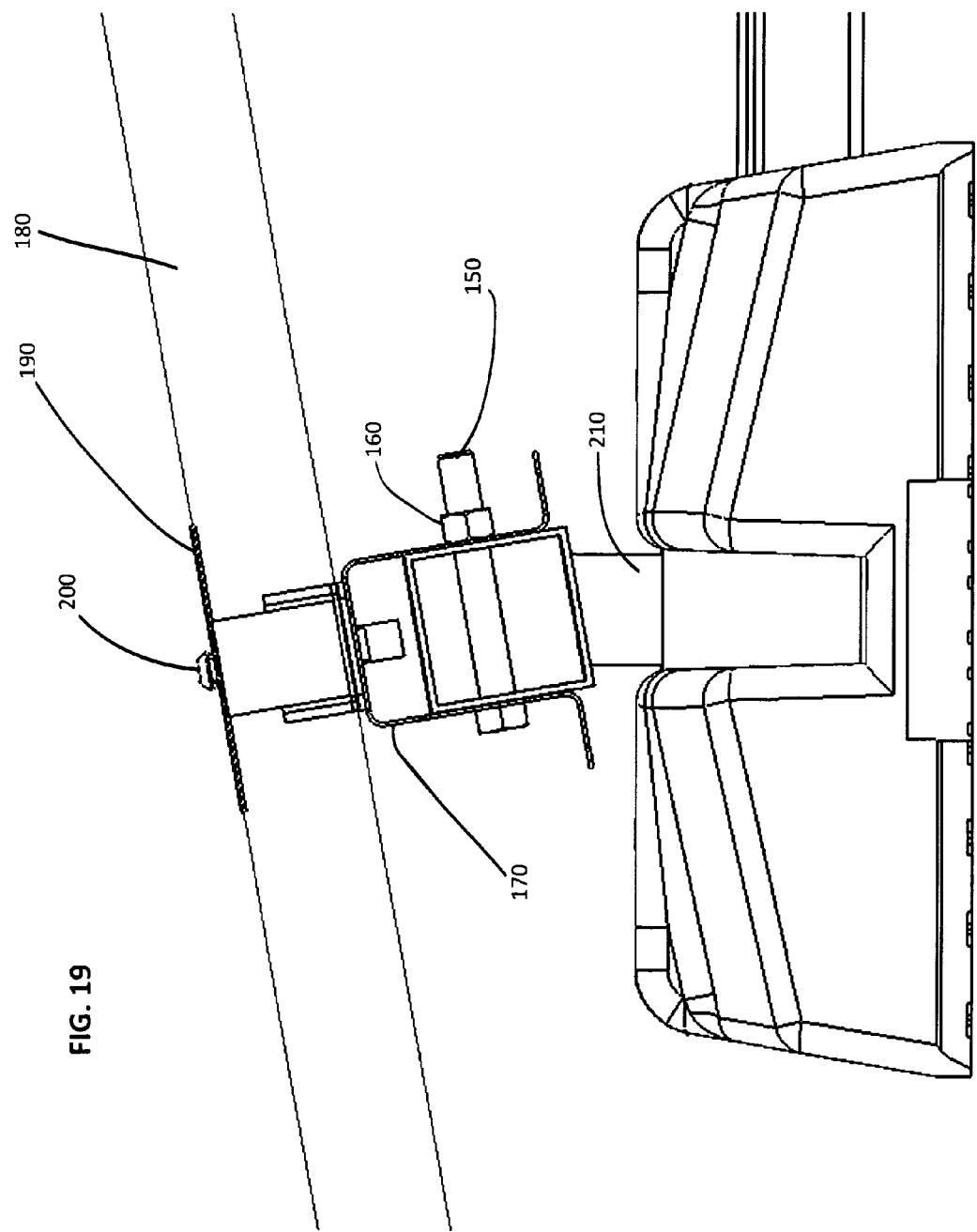

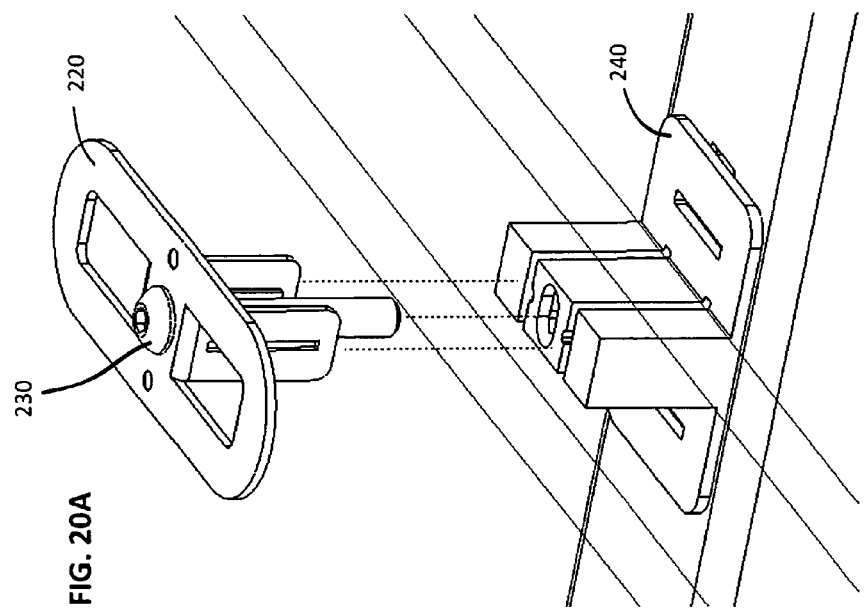
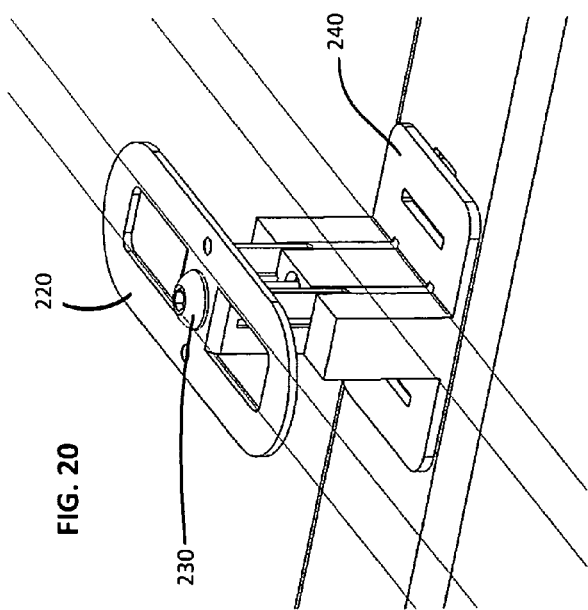

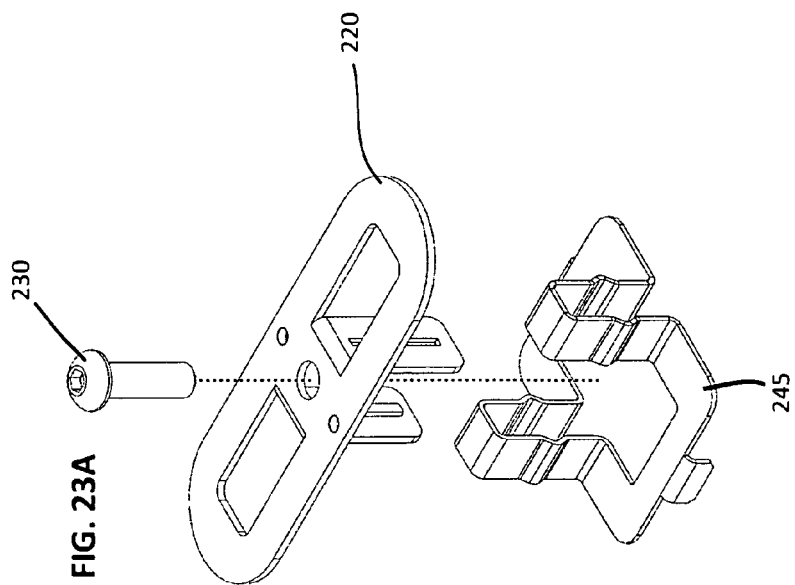
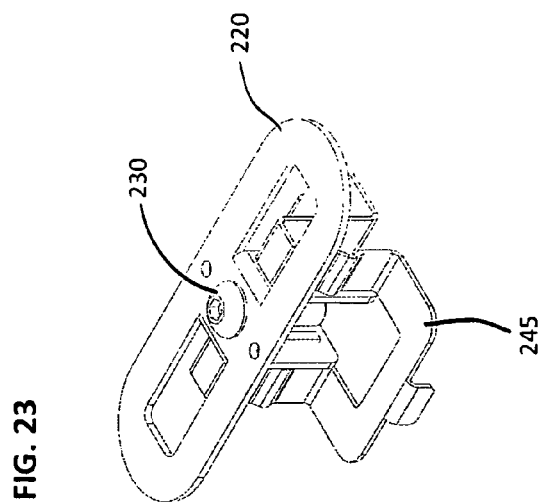

PHOTOVOLTAIC MODULE MOUNTING SYSTEM

BACKGROUND OF THE INVENTION

1. Field of the Invention

The present invention relates generally to a system for mounting and installing photovoltaic solar panels.

2. Description of the Related Art

With the continual rise in conventional energy costs, photovoltaic solar panels ("PV panels") are increasingly becoming cost competitive with other types of energy generation. These PV panel systems are being installed in sites of high energy usage, such as on commercial building rooftops, in industrial open areas, and in proximity to substations tied to the electric grid. These commercial energy systems, or power plants, vary in size but can cover many thousands of square feet on a building rooftop and many acres of land when installed on the ground. Roof mounted systems are particularly attractive in that business owners can elect to offset the energy consumption of their facilities through the use of existing space on the tops of their buildings.

However, such large solar arrays require a sufficiently strong support structure to support not only the weight of the array, but to also provide sufficient resistance to wind forces. Tightly spaced panels effectively form a large surface area, which could result in damage to the panels, the support structure, or both, under strong wind conditions. In addition these systems must accommodate a variety of roof types including built-up roof membranes, monolithic, synthetic membranes, and shingled, mineral surfaces. In order to respond to a variety of roof deck surfaces the mounting structures must provide flexibility in contact elements and attachment systems. These systems must balance the benefits of greater weight, or ballast, to resist wind forces and the load limits of the buildings upon which they are being placed which in many cases were designed to take people walking on them but not the additional load of a large mechanical array.

In many installations, the solar panels are mounted in a "tilted" or inclined configuration in order to maximize the effective capture of solar radiation, i.e. the solar panels are aligned with the solar angle of incidence. In mounting tilted solar panels, however, the effects of various loads on the mounting surface, such as a roof, must be understood. The loads include standing loads and variable loads, also commonly called dead loads and live loads, respectively.

Standing loads are the result of the combined weight of the solar panels and the mounting system. These standing loads are predictable and are therefore easier to accommodate for during the installation of the solar panels and the mounting system.

Variable loads on the tilted solar panels are mainly caused by environmental conditions, such as wind, rain, snow, hail, etc. Other potential environmental hazards include seismic events, temperature extremes, debris and mold. In order to be able to reliably predict and accommodate variable loads, these environmental problems have to be understood and resolved. The most common and problematic forces are wind-related forces (including hurricanes and tornados), namely lift and drag forces generated by the wind conditions. A variety of mounting systems have been commercially available for mounting solar panels, which have attempted to address and mitigate the wind-induced forces. Most prior mounting systems can be divided into three general categories: non-tilted solar arrays; enclosed tilted solar arrays; and tilted solar panels with wind deflectors attached to every row.

U.S. Pat. Nos. 5,746,839 (Dinwoodie) and U.S. Pat. No. 6,570,084 (Dinwoodie) are examples of implementations involving non-tilted solar panels. While non-tilted solar panels do present a lower profile with respect to wind forces, they are less efficient at converting solar energy to electrical energy when installed at locations with higher latitudes. Another disadvantage of a non-tilted system is the accumulation of dirt, dust, debris and snow on top of the solar panels, which can further reduce the conversion efficiency of the panels.

U.S. Pat. No. 6,968,654 (Moulder) discloses an example of an enclosed tilted solar panel system. While such a design offers advantages such as improved rigidity, less debris accumulation, and better protection of electrical components, an enclosed solar panel system increase the cost and weight of the system, is likely to increase wind-induced drag forces and also significantly reduces beneficial cooling from natural airflow. The additional heat introduced into the panels by the mounting system results in lower energy output from the photovoltaic panels.

As shown in U.S. Pat. Nos. 6,063,996 (Takada), U.S. Pat. No. 6,809,251 (Dinwoodie) and U.S. Publication No. 2004/0250491 (Diaz), deflectors may be installed on the north-facing back of every panel in order to reduce the wind-induced uplift forces, when installed in the northern hemisphere. Disadvantages of such systems include significantly increased cost and weight of the installed system. These systems also increase the required labor time for installation in that more parts must be assembled in order to complete the array. In addition, reduced cooling of the solar panels can also significantly reduce the solar conversion efficiency of the system.

It will also be apparent to one skilled in the art that solar panels or modules having extruded metal frames will present different challenges in mounting than those that are produced without additional framing elements. The latter type of solar panels are often referred to as laminates as they are an assembly of one or two sheets of glass along with the photovoltaic material and backing sheet materials to form a laminated assembly. The attachment of these frameless modules, or laminates, is a mechanical challenge often met with the use of clips or hooks that pull one edge of the module into close contact with a supporting structure. Another method of making this connection is to clamp the edge of the module directly and then provide a mounting structure within the sub-structure of the array to hold the module mounting clamp.

SUMMARY OF THE INVENTION

In general, the present invention is a photovoltaic module mounting system for mounting photovoltaic modules to a mounting structure, which provides a more universal mounting structure for use with laminate or framed modules of differing shapes and sizes, and from different manufacturers.

According to one embodiment of the present invention, a photovoltaic module mounting system comprises a first rail bracket attached between a first set of two feet, a second rail bracket attached to a second set of two feet, a first rail connected between the first and second rail brackets, a second rail connected between the first and second rail brackets, and a plurality of clamps attaching at least one photovoltaic module to the first and second rails.

The rail bracket may comprise a main member, a first post attached to a first end of the main member, a second post attached to a second end of the main member, and a beam connected between the first and second posts.

The mounting system may further comprise a first shade link connected between the first set of feet and a third set of feet, and a second shade link connected between the second set of feet and a fourth set of feet, wherein the shade links attach the mounting system into an integrated array of photovoltaic modules.

According to a second embodiment, a photovoltaic module mounting system for mounting framed photovoltaic panels comprises a first set of two feet, each foot in the first set having a first post, a second set of two feet, each foot in the second set having a second post, a first rail link connected between one first foot and one second foot, a second rail link connected between one first foot and one second foot, a first rail connected between two first posts, a second rail connected between two second posts, a plurality of photovoltaic modules having metal frames positioned on the first and second rails, and a plurality of clamps attaching the metal frames of the photovoltaic modules to the first and second rails.

The mounting system may further comprise a shade link connected to each of the second feet, wherein the shade links interconnect the module mounting system in an integrated array of photovoltaic modules.

The use of clamps to mount the modules provides flexibility for using modules of different size, shapes and from different manufacturers with the mounting structure.

BRIEF DESCRIPTION OF THE DRAWINGS

The present invention will be readily understood by the following detailed description in conjunction with the accompanying drawings, wherein like reference numerals designate like structural elements, and in which:

FIG. 1B is a side view of the solar panel mounting system of FIG. 1A;

FIG. 1C is a top view of the solar panel mounting system of FIG. 1A;

FIG. 19 is a detailed side elevation of the of a southern rail bracket, according to an embodiment of the present invention;

FIG. 20 illustrates an embodiment of a preferred clamp for use with framed modules, according to one embodiment of the invention;

FIGS. 23 and 23A illustrate an alternate clamp embodiment which may be used with the system of FIG. 16.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

Figure 1A:
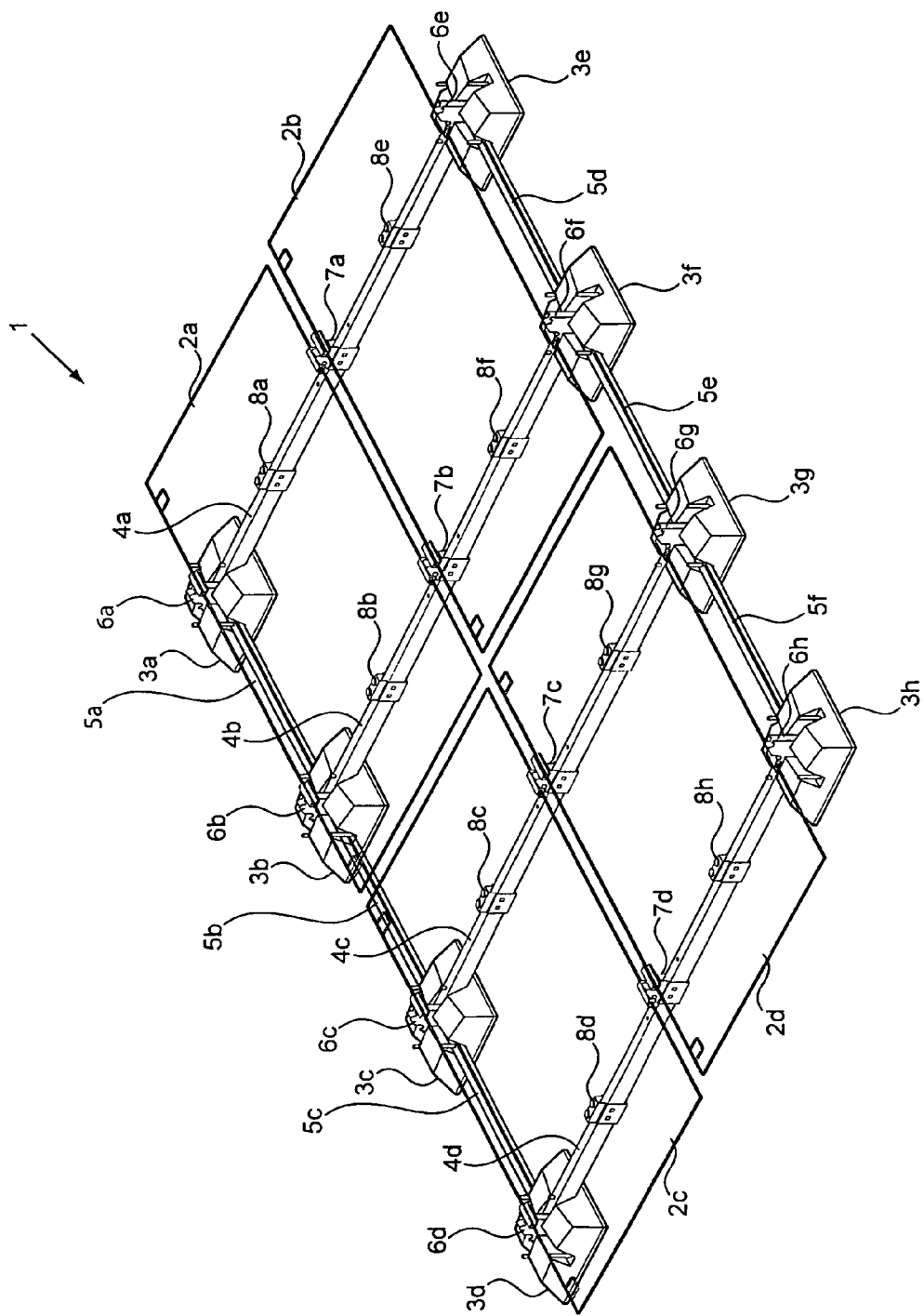
FIG. 1A is a perspective view of the solar panel mounting system according to an embodiment of the present invention.

FIGS. 1A-1D illustrate the basic components and arrangement of the solar array mounting system according to an embodiment of the present invention. FIG. 1A is a perspective view of a solar panel mounting system 1 according to an embodiment of the present invention. Four photovoltaic solar panels 2a-2d are mounted on the mounting structure. The solar panels 2a-2d can be "frameless" panels formed as laminates of two sheets of glass encasing photovoltaic material. For example, the panels 2a-2d may be photovoltaic "thin film" panels. The mounting system 1 includes several flexible feet (or "pedestals") 3a-3h. The feet 3a-3h are the contact points for the system 1 with the mounting surface (roof or ground). Spanning the distance between the feet and the width of two panels 2a, 2b or 2c, 2d are long links 4a-4d. The long links 4a-4d are preferably installed along a North-South axis direction. Connecting the feet along the length of a panel are short links 5a-5f, wherein the short links 5a-5f are preferably installed along an East-West axis direction. The long and short links are preferably formed from roll steel, which is galvanized or powder-coated to prevent corrosion. The panels 2a-2d are mounted to the feet 3a-3h via tilt brackets 6a-6h. At the mid-span of each long link 4a-4d, a mid-link bracket 7a-7d connects to two adjacent panels, 2a, 2b or 2c, 2d. To provide additional support for panels under heavy loads (i.e. snow), center panel supports 8a-8h may be mounted on each long link 4a-4d under the centerline of each panel 2a-2d.

Figure 1D:
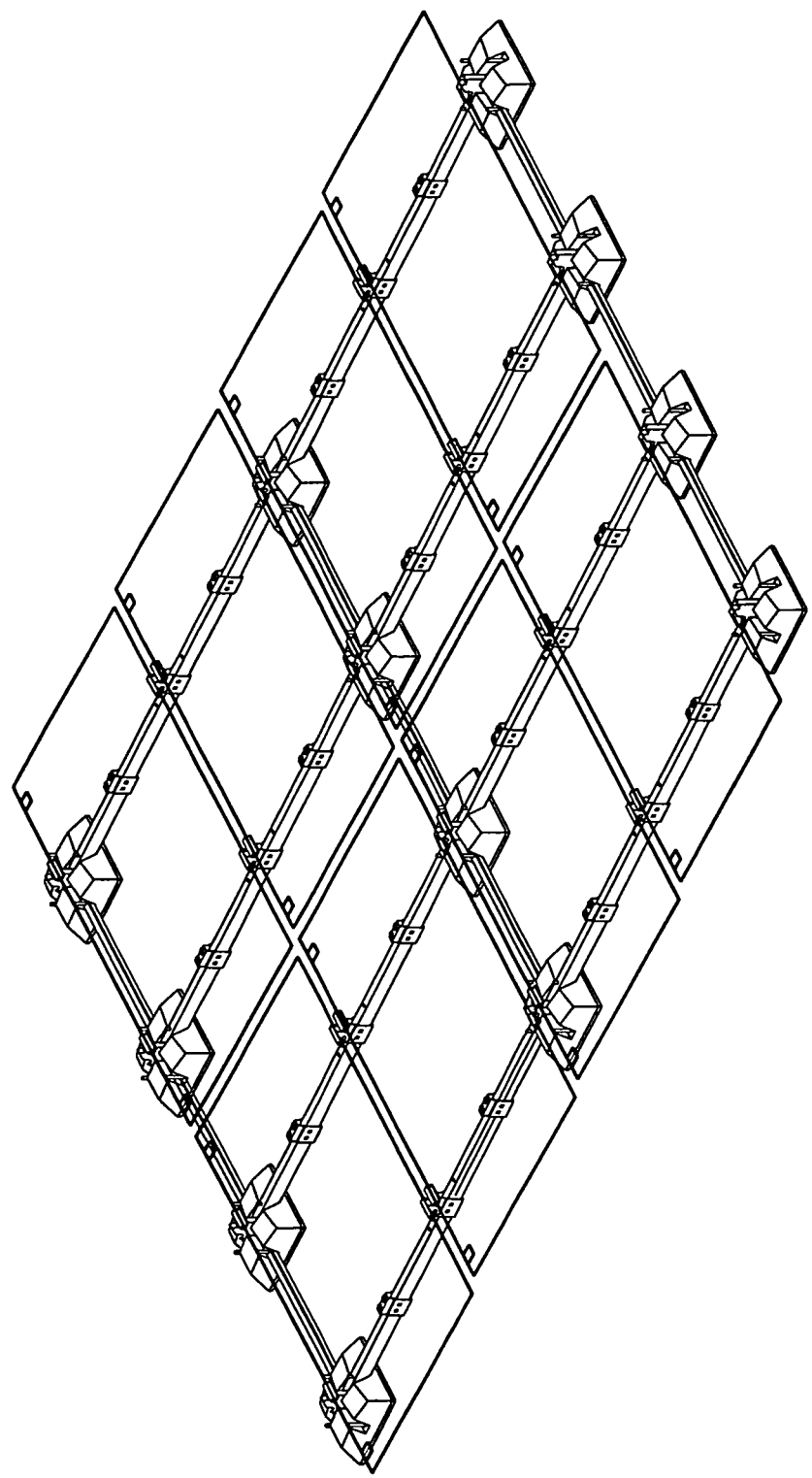
FIG. 1D is an additional perspective view of the solar panel mounting system of FIG. 1A shown with multiple module mounting sections installed.

FIG. 1B shows a side (end) view of the solar panel mounting system of FIG. 1A. Note that the solar panel on the left 2c is mounted higher on the tilt bracket 6d and slopes down to mount to the mid-link bracket 7d. Similarly, the right panel 2d, mounts at the top of the mid-link bracket 7d, and mounts to a lower position on its respective tilt bracket 6h. The angle of tilt for each panel 2c, 2d is preferably in the range of 2°-5°. The center panel supports 8d, 8h are preferably snapped on from the top of the long link 4d, to provide support to the panel. The center panel supports 8d, 8h preferably have rubber feet to abut against the bottom of the panels. FIG. 1C is a top view of the system of FIG. 1A. In a preferred embodiment, the feet 3a-3h are approximately 14 inches square, the long links 4a-4d are 6-7 ft. long, and the short links 5a-5f are 3-4 ft. long. As discussed below, one of the advantages of the present invention is that the size and thicknesses of the linking components can easily be changed to accommodate different installation environments. FIG. 1D further illustrates a 4×2 roof top installation. The mounting system's modular design allows it to be easily adapted to different installation size requirements.

Figure 1E:
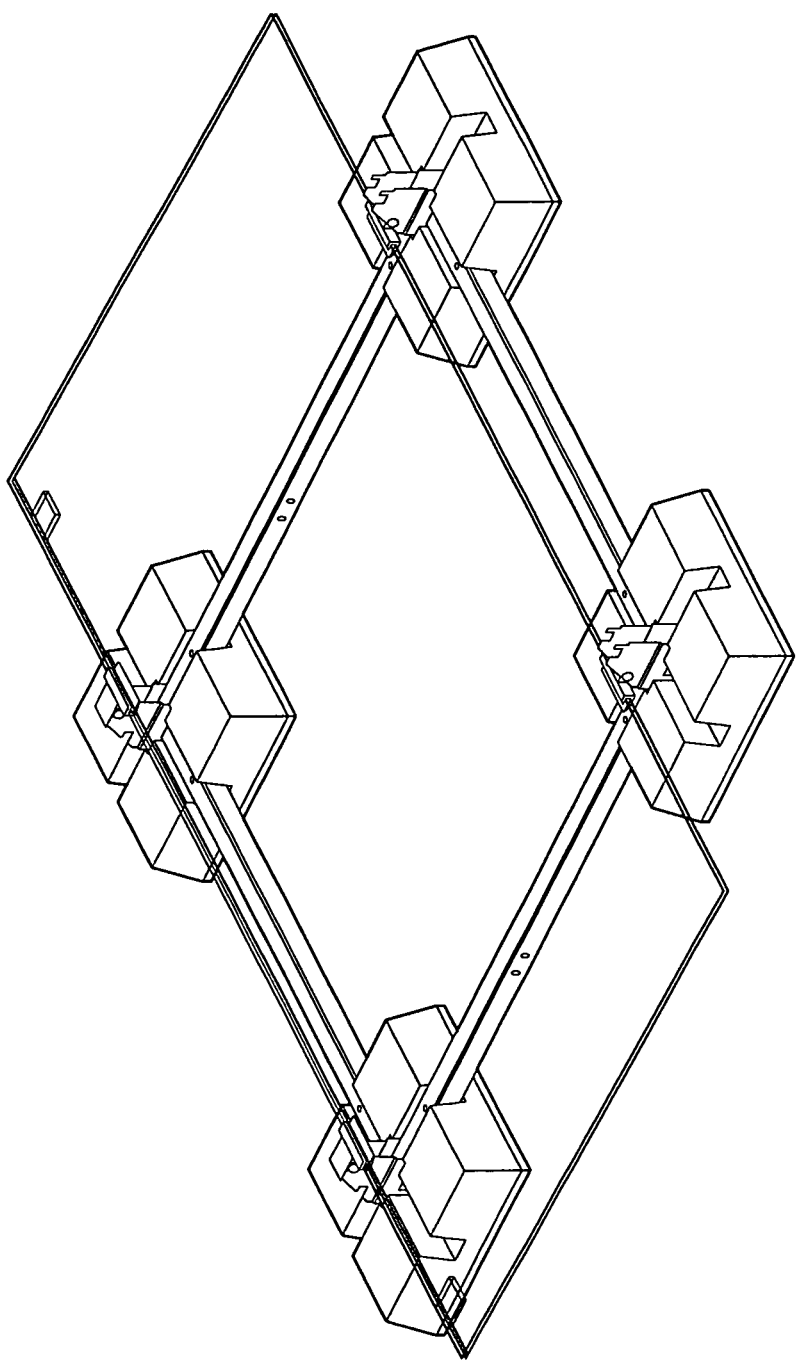
FIG. 1E is a perspective view of an alternate embodiment of the solar panel mounting system, illustrating the components for supporting one panel.
Figure 1F:
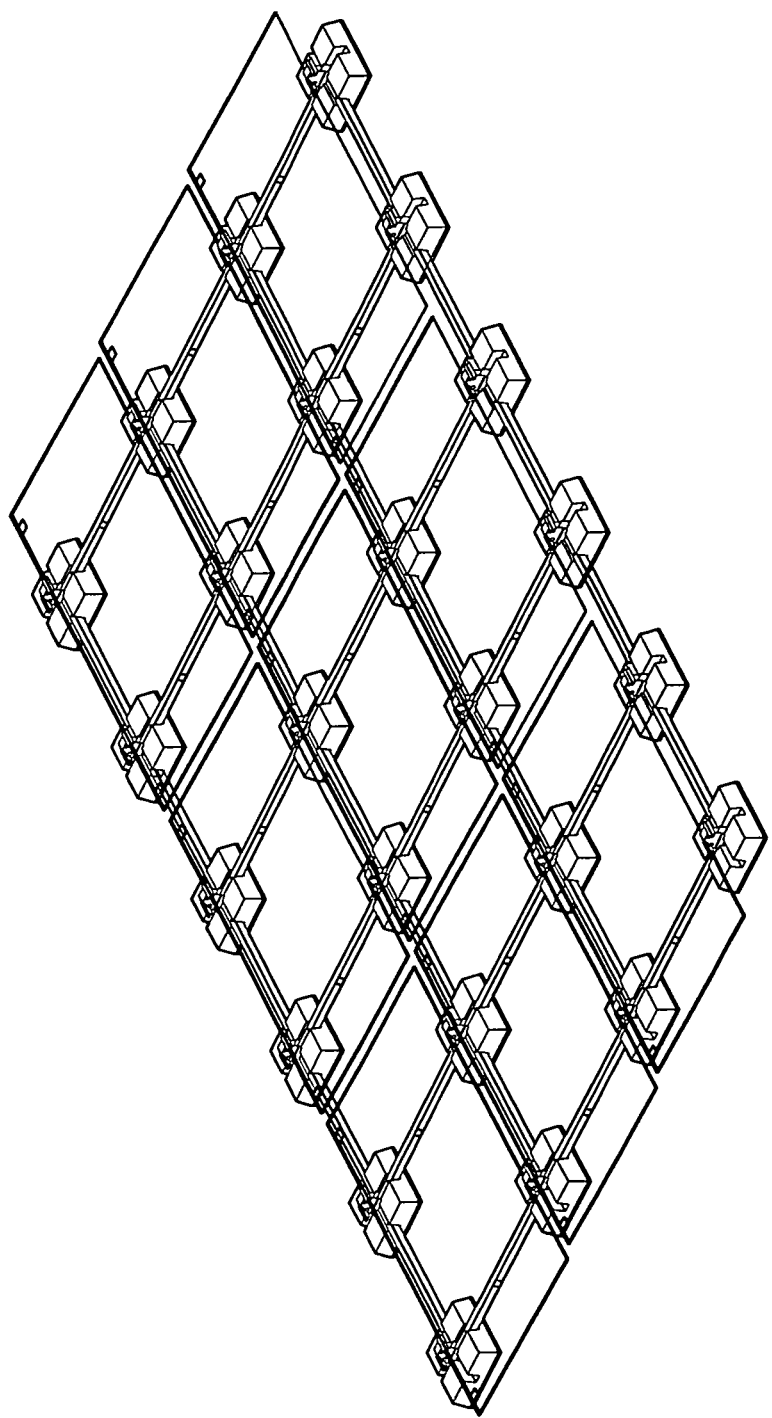
FIG. 1F is a perspective view of the embodiment of FIG. 1E showing a plurality of panels installed on the system.

FIG. 1E illustrates an alternate embodiment of the solar mounting system of the present invention. As shown, each panel is supported by four feet and four links. In this embodiment, note that there are no mid-link brackets, and the feet may be connected using links of a similar size. Such a configuration may be desired in installations having very heavy potential loads. FIG. 1F shows a panel array configured according to the embodiment of FIG. 1E.

Figure 1G:
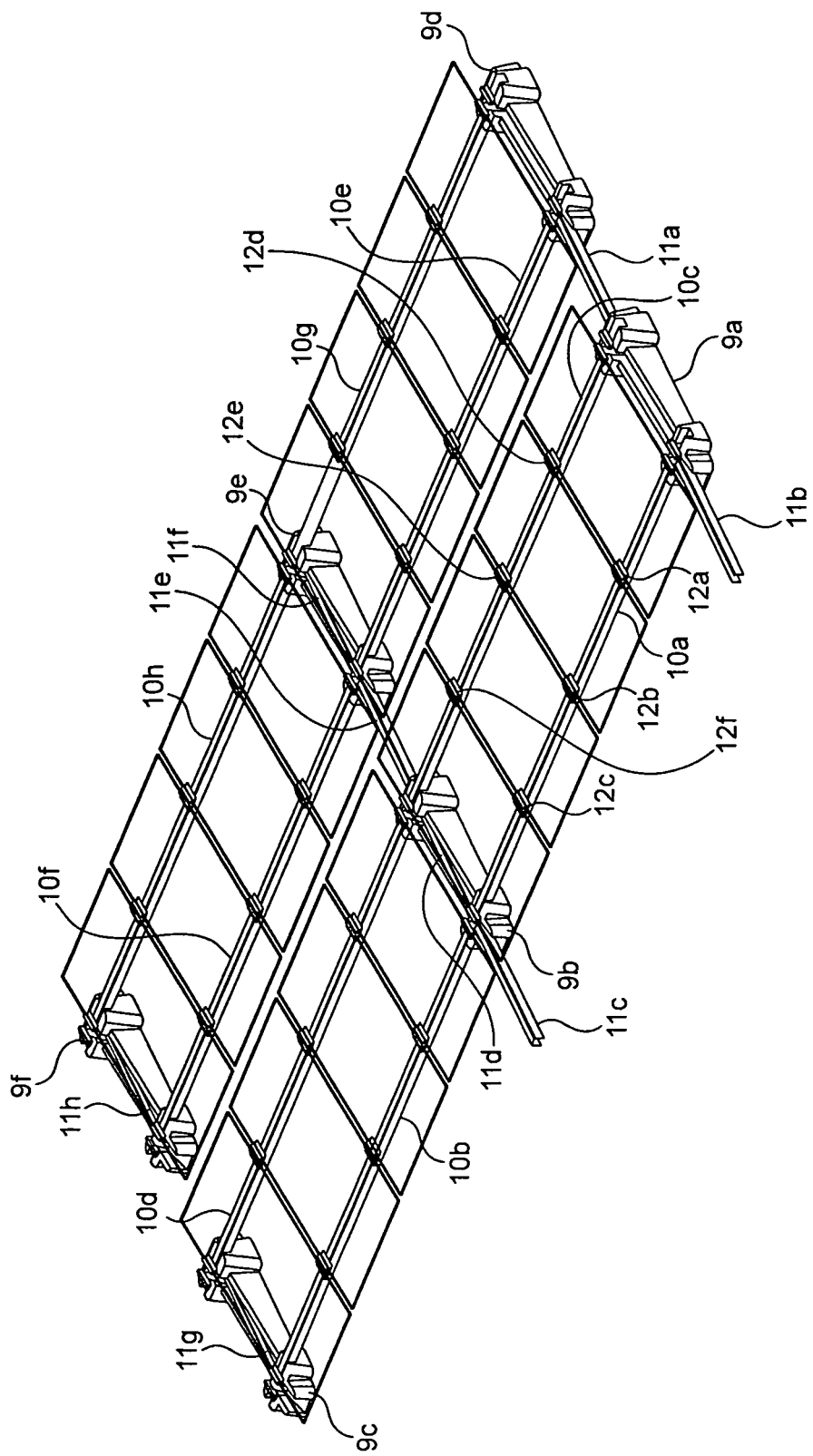
FIG. 1G is a perspective view of another embodiment of the solar panel mounting system according to the present invention.

FIG. 1G illustrates another alternate embodiment of a solar panel mounting system. In this embodiment, the flexible feet 9a-9f may be formed as longer elements effectively spanning two links (i.e. 10a and 10c). The channel formed in the feet between links may itself have a link (i.e. 11d, 11f, 11g, and 11h) or the channel may be empty as shown in feet 9a and 9d. A tilt bracket is installed at each link location in the feet 9a-9f.

Multiple mid-link brackets 12a-12f may be installed on the links in each row, such that, for example, four panels are supported between feet elements 9a, 9b. In addition, cross links 11a, 11e can connect feet row-to-row. In another variation, the feet of the embodiment of FIG. 1G may be formed as the separate feet illustrated in the previous embodiments, and the feet connected with links as described above.

Figure 2A:
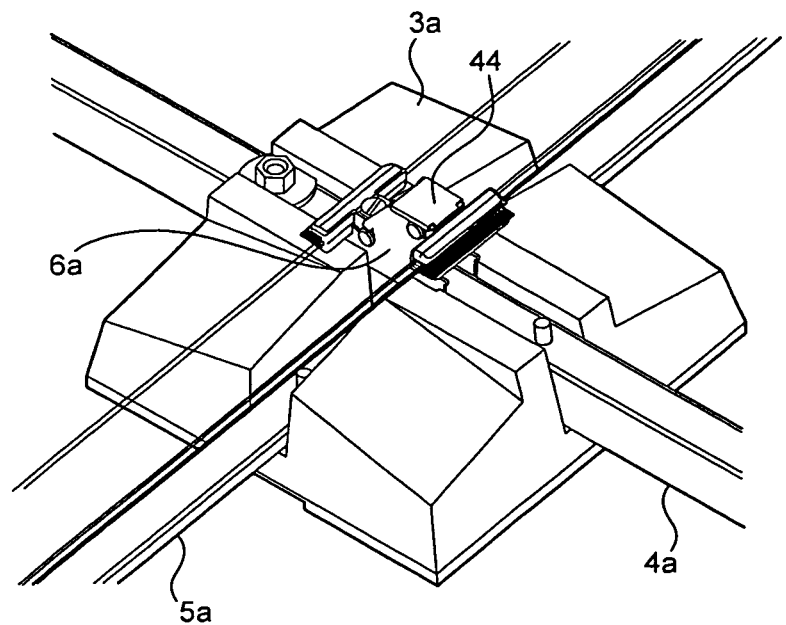
FIG. 2A is a perspective view of one embodiment of the foot, link, tilt bracket and panel clamp assembly according to the present invention.
Figure 2B:
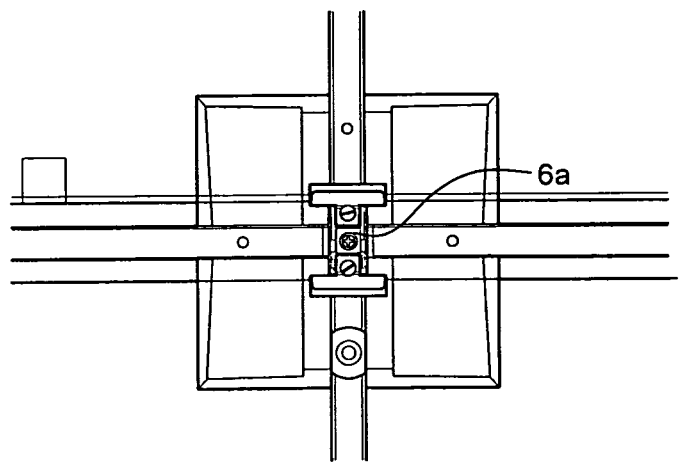
FIG. 2B is a top view of one embodiment of the foot, link, tilt bracket and panel clamp assembly according to the present invention.
Figure 2C:
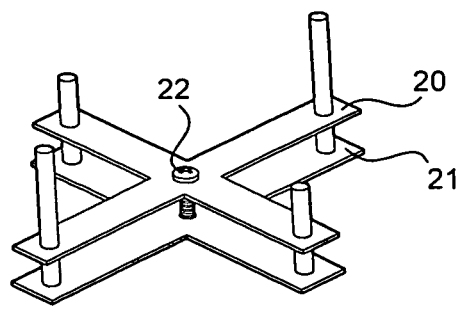
FIG. 2C is a top perspective view of the cruciform and threaded rod assembly embedded in the foot assembly shown in FIG. 2A.
Figure 2D:
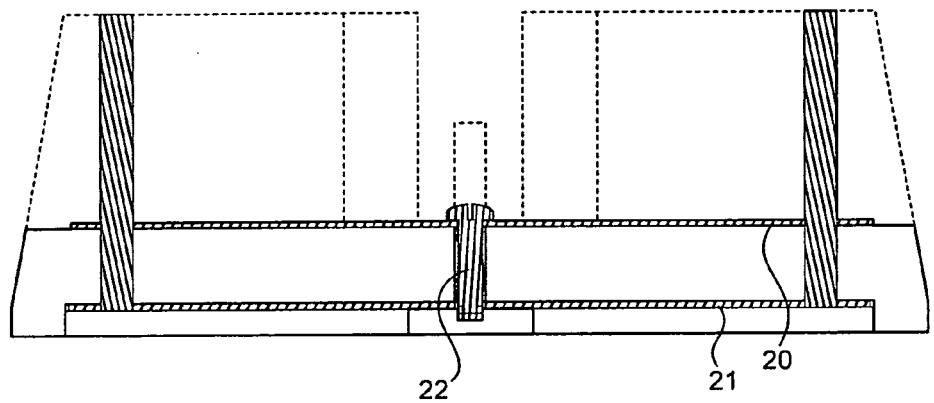
FIG. 2D is cut away section view of the foot and cruciform assembly shown in FIG. 2A.

The construction of a foot 3a is shown in greater detail in FIGS. 2A-2E. An enlarged view of a foot 3a is shown in FIG. 2A. The foot 3a is preferably formed of rubber or other flexible material. The top of the foot contains two perpendicular slots for attaching the long links and short links. A tilt bracket is located generally in the center of the foot (FIG. 2B; top view). In a preferred embodiment, the foot 3a includes an upper 20 and lower 21 cruciform, as shown in FIG. 2C. The cruciforms are preferably formed from stainless steel. As shown in cross-section in FIG. 2D, the lower cruciform 21 is mounted to the bottom of the rubber foot, and the upper cruciform is attached to the top of the foot, generally aligned with the perpendicular slots. A center bolt 22 attaches the upper and lower cruciforms 20, 21 to the foot. The lower cruciform 21 preferably fits in an indentation shaped like the cruciform in the bottom of the foot. Alternatively, the cruciforms 20, 21 could be molded into the foot at the time the foot is manufactured. Four threaded rods or studs protrude through the cruciforms and foot to provide attachment points for the long and short links. The links are attached to the threaded rods with washers and nuts. For the embodiment of the feet in FIG. 1G, the feet may be formed with a set of cruciforms on each end.

In an alternative embodiment, the foot may be formed with a cement or other similar material rigid base, with a rubber upper section to connect to the links. This may eliminate the need to use the cruciforms. In another alternate embodiment, the foot may be formed with only one cruciform, but the threaded rods have a much larger diameter to counter-act any bending forces.

As described, the mounting system acts like an integrated net—sharing the loads when forces pull up on any part of the system. Specifically, the rubber feet act as "nodes" that are able to flex as forces pull the links outward. However, the two cruciforms provide strength and rigidity to maintain system integrity. The long links take the down push forces on the solar panels from the wind and snow, and flex at each node. In addition, the modular design allows the system to be installed on an undulating roof, since the rubber feet can adjust to variations in the mounting surface.

Figure 2E:
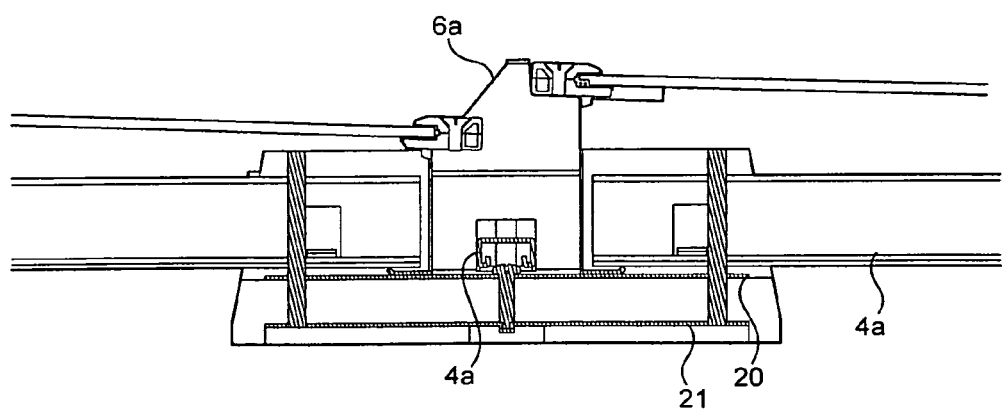
FIG. 2E is cut away section view of the foot and cruciform assembly with the links, PV panels, tilt bracket, and module clamps shown in FIG. 2A.

As shown in FIGS. 2A and 2E, the long links (i.e. 4a) are normally taller in cross-section that the short links (i.e. 5a), since the long links are spanning a greater distance under load. Thus, the steel bolts through the foot are necessarily longer for the long links than for the short links. In assembly, the cruciforms 20, 21 and a tilt bracket (i.e. 6a) are attached to the foot with the center bolt 22. Then the long links (i.e. 4a) and short links (i.e. 5a) are attached to the foot using the threaded rods with the washers and nuts. Note that the long links and short links abut the tilt bracket 6a and overlap the extended bracket sections (see FIG. 5A). With such a modular construction, the entire mounting system can be pre-configured before any panels are attached to the system.

Figure 3A:
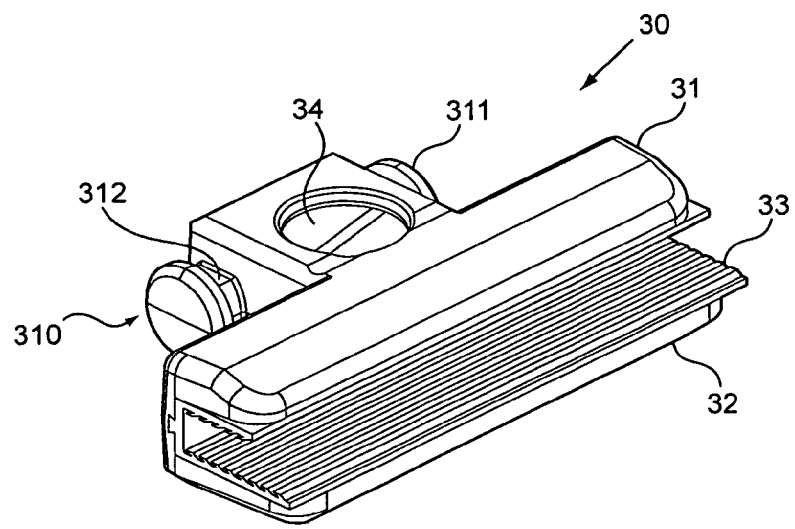
FIG. 3A is a perspective view of a panel clamp embodiment according to the present invention.
Figure 3B:
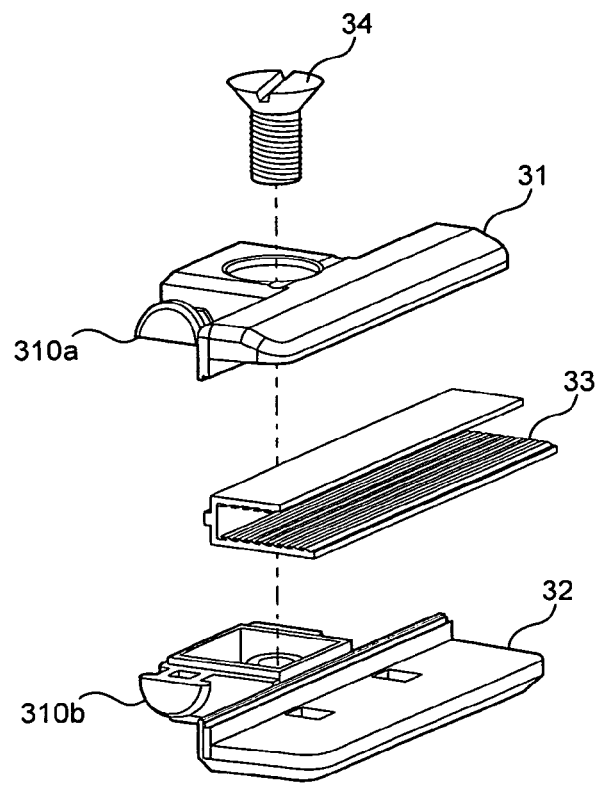
FIG. 3B is an exploded view of the panel clamp of FIG. 3A.

FIGS. 3A and 3B illustrate a panel clamp according to a preferred embodiment of the present invention. As noted earlier, existing mounting systems have difficulty mounting to a frameless panel, and especially to panels made from two sheets of glass. The present clamp 30 is designed to mount such frameless panels to the mounting system of the present invention. The panel clamp 30 includes two main body parts—an upper section 31 and lower 32 section preferably made of cast aluminum. These clamp part sections 31, 32 are held together by a threaded fastener 34 that is inserted through the top section 31 and threaded into the bottom section 32 of the clamp 30. The fastener 32 is preferably a stainless steel bolt having 5/16-18 threads. The interface between the assembled clamp halves (clamp "faces") and the module edge is filled by a flexible gasket material 33. In one embodiment of the invention, the flexible gasket is made from Ethylene Propylene Diene Monomer (EPDM) rubber. This material has small, finger-like protrusions that allow for easy insertion onto the module edge, but makes it more difficult to remove the clamps from the module once installed. The panel clamp 30 is preferably about 4 inches wide and 1 inch high.

In an alternate embodiment, the panel clamp upper and lower sections comprise molded polymer resin that is resistant to the effects of sustained outdoor exposure. These polymer parts have the clamping edge of the assembly overmolded with a flexible rubber material that creates a better grip on the module material which is typically glass.

On each side of the panel clamp 30 is a mounting post 310, 311. The mounting post 310, 311 engages the tilt bracket or mid-link bracket as described below. The mounting post 310 may be formed as part of the upper 310a and lower 310b sections, respectively. The mounting posts 310, 311 are formed similarly to bolt or screw heads, having a larger outer lip or "head" and an inner "collar" 312 of smaller diameter. In an alternate design, the mounting posts may comprise a separate metal element, formed with a head and collar on each end, and held in place between the upper 31 and lower 32 sections. In a preferred configuration, each mounting post 310, 311 has the upper and lower portions (edges) of each "collar" 312 of the mounting post flattened off, in order to help prevent rotation of the clamp in a bracket once it is installed.

Figure 3C:
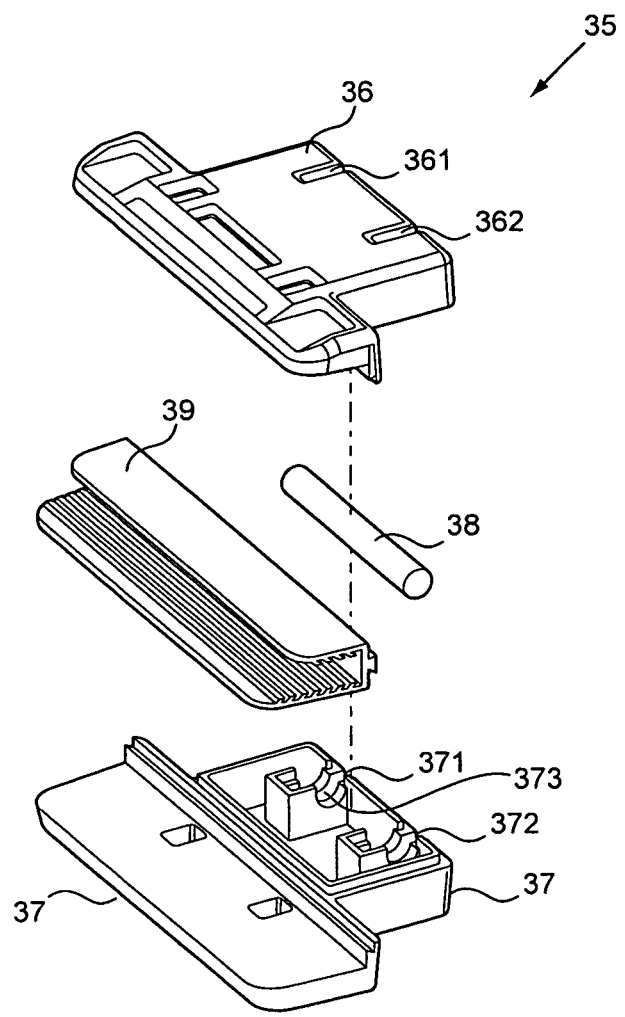
FIG. 3C is an exploded view of an alternate embodiment of the panel clamp.
Figure 3D:
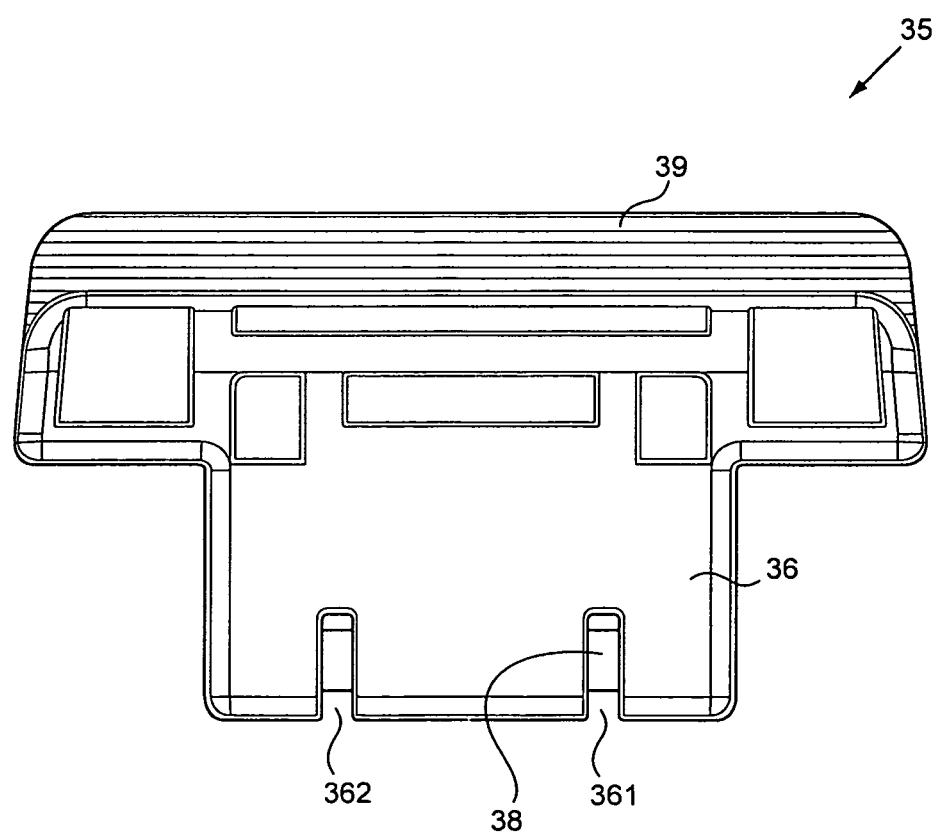
FIG. 3D is a top view of the clamp of FIG. 3C.

An alternate panel clamp design is illustrated in FIGS. 3C and 3D. As shown in FIG. 3C, the panel clamp 35 includes an upper section 36 and a lower section 37. Those sections 36, 37 may be formed out of plastic and configured to "snap" fit or glued together. Other materials may be used, and the two sections may be held together by a threaded bolt as previously described. The upper section includes two slots 361, 362 spaced to engage the tilt and mid-link bracket openings. Similarly, the lower section includes slots 371, 372 aligned with the slots 361, 362 in the upper section. A mounting axle (rod) 38 is held in a half channel 373 in the lower section 37, and a similar half channel (not shown) formed in the upper section 36. The axle 38 is held in position by the upper 36 and lower sections 37, and is generally perpendicular to the slots. A grommet 39 is positioned between the clamp sections to grip the panel, and may be constructed as noted above.

FIG. 3D shows the assembled clamp, and the axle 38 exposed through the slots. In operation, the panel clamp 35 is lowered into a bracket such that the axle 38 engages the mounting openings (described in detail below) in a bracket.

As described herein, the panel clamp comprises two pieces. However, the clamps may be molded as single pieces as well.

While specific preferred mounting clamps have been described herein, other panel mounting structures may be utilized with the present system, as long as the mounting structures are configured to interface with the mounting openings in the tilt and mid-link brackets.

Once the mounting system has been assembled, the mounting clamps are attached to the photovoltaic panels. Two clamps are attached to each (long) side of a panel at a quarter distance point on each edge, as shown in FIGS. 1A and 1C.

Figure 4A:
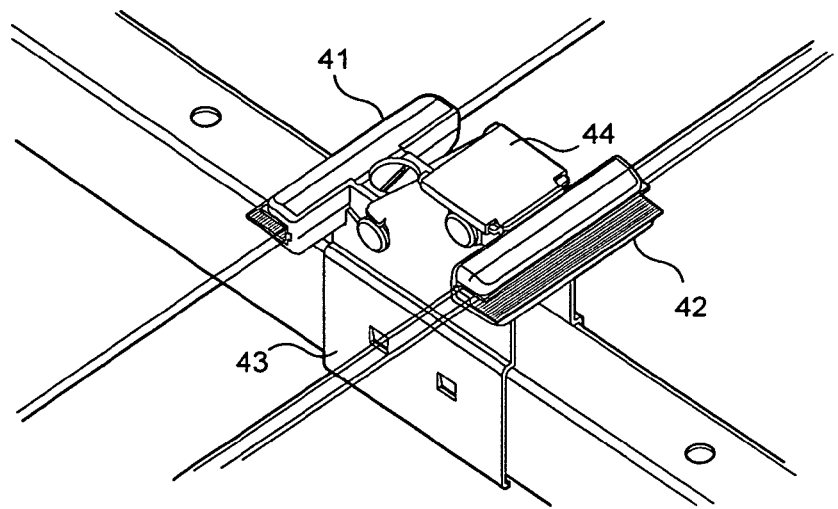
FIG. 4A is a perspective view of the panel clamps of FIG. 3A assembled into a tilt bracket mounted to the top of structural link.
Figure 4B:
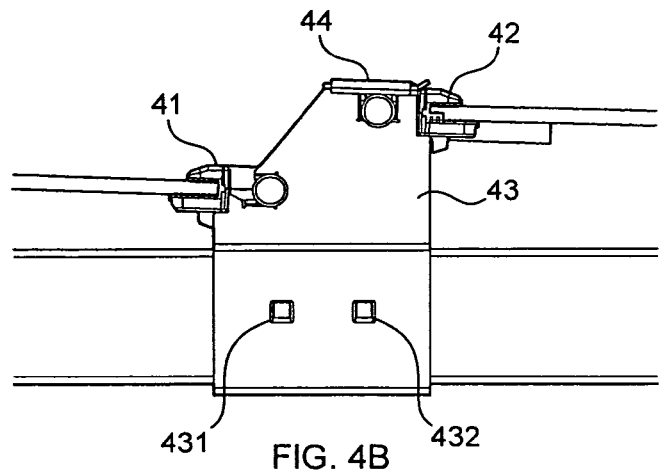
FIG. 4B is a side view showing the panel clamps of FIG. 3A attached to the solar panels and the tilt bracket.
Figure 4C:
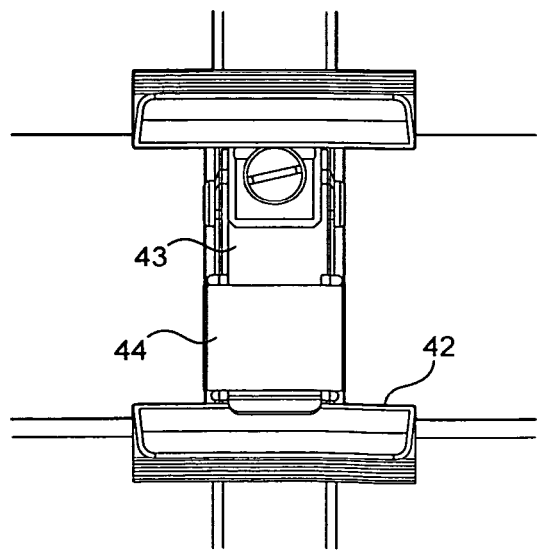
FIG. 4C is a top view of the panel mounting clamps of FIG. 3A shown attached to the edges of the solar panels in an array.

FIGS. 4A, 4B and 4C illustrate two panel clamps attached to a mid-link bracket in an isometric view, side view and top view, respectively. One clamp 41 attaches to the mid-link bracket at a side position via its mounting posts, effectively making the panel edge lower than the other side. Similarly, a second clamp 42 attaches to a top of the mid-link bracket via its mounting posts. A locking cap 44 may be slid over the top of the top clamp 42 to help prevent uplift forces from disengaging the clamp 42 from the bracket 43. The locking cap 44 can be configured to slide over the bracket 43, which also helps keep the bracket from spreading open under loads. The locking cap 44 may be formed from metal with the sides bent down, and a in-facing lip on each edge (i.e. forming a block "C" in profile). Each side has a lip to engage the bracket and slides over the top of the bracket to lock into position.

The mid-link bracket 43 preferably slides onto a long link from the bottom, and engages pre-formed holes in the long link. For example, square holes can be punched into the long links to engage indented tabs 431, 432 punched into the mid-link bracket 43.

Figure 4D:
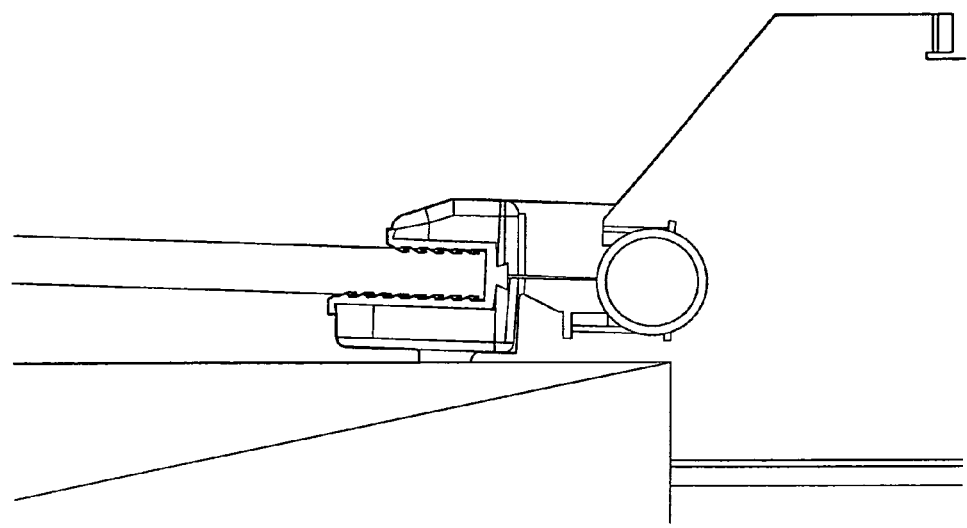
FIG. 4D is an enlarged view of the clamp attached to a solar panel.

FIG. 4D is an enlarged side view of the panel clamp 30 attached to a solar panel. Note that the "fingers" of the rubber grommet material are angled such that the clamp can more easily slide onto a solar panel, but resists the removal of the clamp in the reverse direction. This embodiment is suitable for panels where the top and bottom sheets of glass are aligned.

Figure 4E:
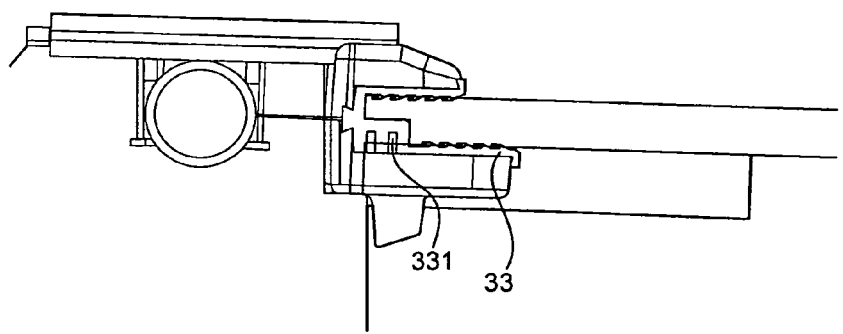
FIG. 4E is an enlarged side view of an alternative embodiment of the panel clamp for use with panels have an offset lower edge.

In certain solar panels, the bottom sheet of glass is 0.5 inch or so narrower than the top sheet to allow for the electrical wiring and/or connectors. The panels are formed such that the glass sheets are flush on one edge, and offset on the other. Thus, on one edge of the panel the panel clamps need to account for this offset. As shown in FIG. 4E, in an alternate embodiment, the rubber grommet 33 may be formed with a rectangular filler block 331 to fill in the gap in the edge of the panel.

Figure 4F:
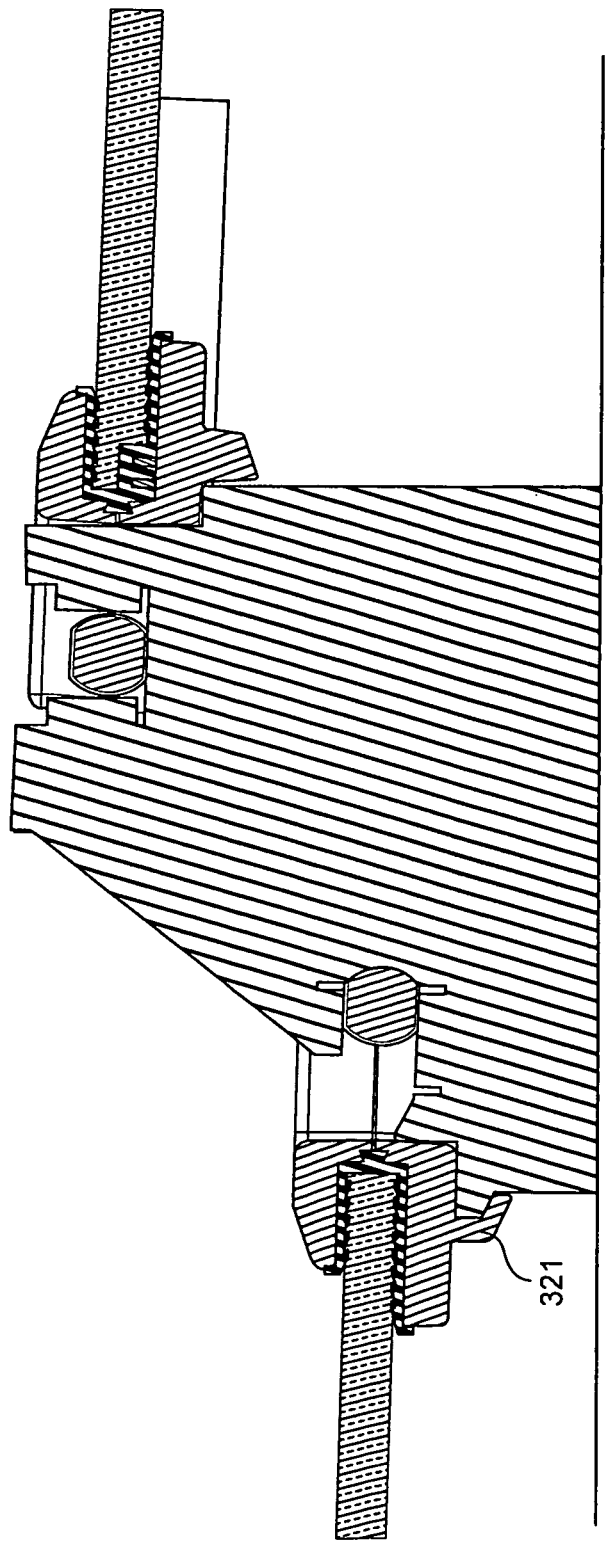
FIG. 4F is a side view of the panel clamp and bracket assembly illustrating the locking tongue on the bottom of the panel clamp.

In addition, as shown in FIG. 4F, the panel clamps are preferably formed with a locking tongue 321 on the bottom of the clamp to engage tabs on the tilt and mid-link brackets (as described below).

Figure 5A:
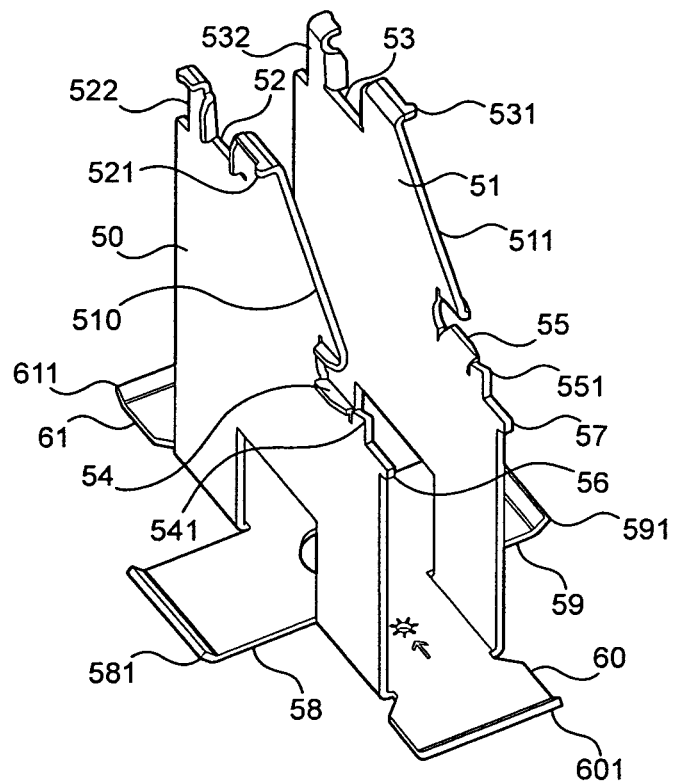
FIG. 5A is a perspective view of the tilt bracket that is mounted to the top of the foot assembly.
Figure 5B:
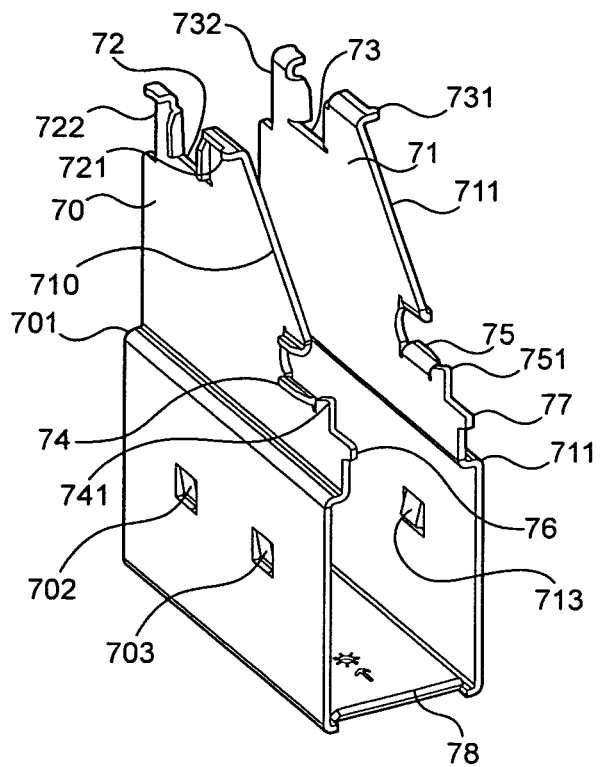
FIG. 5B is a perspective view of the tilt bracket that is mounted to the middle of the structural link component.

A detailed view of the tilt bracket is shown in FIG. 5A, and a detailed view of the mid-link bracket is shown in FIG. 5B. Note that the top halves of both brackets are generally similar in construction, with the main differences on the lower halves of the brackets. The brackets are preferably formed from sheet metal as unitary pieces.

In FIG. 5A, the tilt bracket comprises two symmetric sides 50, 51. On the top of each side is a mounting opening 52, 53 for a panel clamp mounting post. Behind each mounting opening 52, 53 is a notch 522, 532 for engaging the clamp. The bracket includes a tab 521, 531 on each side of the top to lock the locking cap (not shown) into place. A front face of each side 50, 51 has an angled edge 510, 511, which helps guide a panel clamp into the lower mounting openings 54, 55 during installation. Each lower mounting opening 54, 55 include a catch 541, 551 to guide and secure the panel clamp into place. The lower mounting openings 54, 55 are deep enough to allow some horizontal movement of the panel clamp in the bracket to facilitate some movement and alignment of a panel during installation. Each side also includes a locking tab 56, 57 to engage a locking tongue 321 on a panel clamp. Any upward forces on a panel will cause the panel clamp to try and lift up. However, due to the engagement of the panel clamp with the locking tabs 56, 57, the upward force is distributed through the mounting system via the bracket.

The tilt bracket, as discussed above, is mounted to a foot. The long links engage front 60 and rear 61 extensions, while the short links engage the side extensions 58, 59. The overlapping of the links with the extensions provided for load sharing between the elements. In order to improve the element-to-element grounding of the metal components, each extension includes a lip 601, 611, 581, 591 to "bite" into the links and insure a solid metal-to-metal ground connection.

As noted above the construction of the upper half of the mid-link bracket is similar to the construction of the upper half of the tilt bracket. As shown in FIG. 5B, the mid-link bracket comprises two symmetric sides 70, 71. On the top of each side is a mounting opening 72, 73 for a panel clamp mounting post. Behind each mounting opening 72, 73 is a notch 722, 732 for engaging the clamp. The bracket includes a tab 721, 731 on each side of the top to lock the locking cap (not shown) into place. A front face of each side 70, 71 has an angled edge 710, 711, which helps guide a panel clamp into the lower mounting openings 74, 77 during installation. Each lower mounting opening 74, 77 include a catch 741, 751 to guide and secure the panel clamp into place. The lower mounting openings 74, 75 are deep enough to allow some horizontal movement of the panel clamp in the bracket to facilitate some movement and alignment of a panel during installation. Each side also includes a locking tab 76, 77 to engage a locking tongue 321 on a panel clamp. Any upward forces on a panel will cause the panel clamp to try and lift up. However, due to the engagement of the panel clamp with the locking tabs 76, 77, the upward force is distributed through the mounting system via the bracket.

The mid-link bracket, as discussed above, is mounted to a long link, and preferably snaps into place from the bottom of the link. Thus, the lower portion of the mid-link bracket is configured to conform to the size and shape of a long link. The top portion of the mid-link bracket is recessed 701, 711 to insure a tight fit around the long link. In addition, alignment and grounding tabs 702, 703, 713 (one not shown) preferably engage in square holes pre-punched into the long link. Again, to improve metal-to-metal contact for grounding the front and rear (not shown) of the link channel include a lip 78 to improve grounding.

As mentioned earlier, one of the advantages of the present mounting system is that the size and lengths of the long and short links may be adjusted as needed for particular installations. For example, in colder climates with winter snows and high winds, the links may need to be stronger to support the increased loads. In a standard implementation, the long links are approximately 1⅝"×2¾" in cross-section and the short links are 1⅝"×1". However, to support heavier loads, the links may be formed out of a heavier gauge steel. In order to reduce, costs, though, the entire mounting system may not need to be made out of the thicker steel. Specifically, the long and short links may have a uniform external profile, but varied strength depending on a location within a panel array, or the links may have different cross-sections for different applications.

Figure 6A:
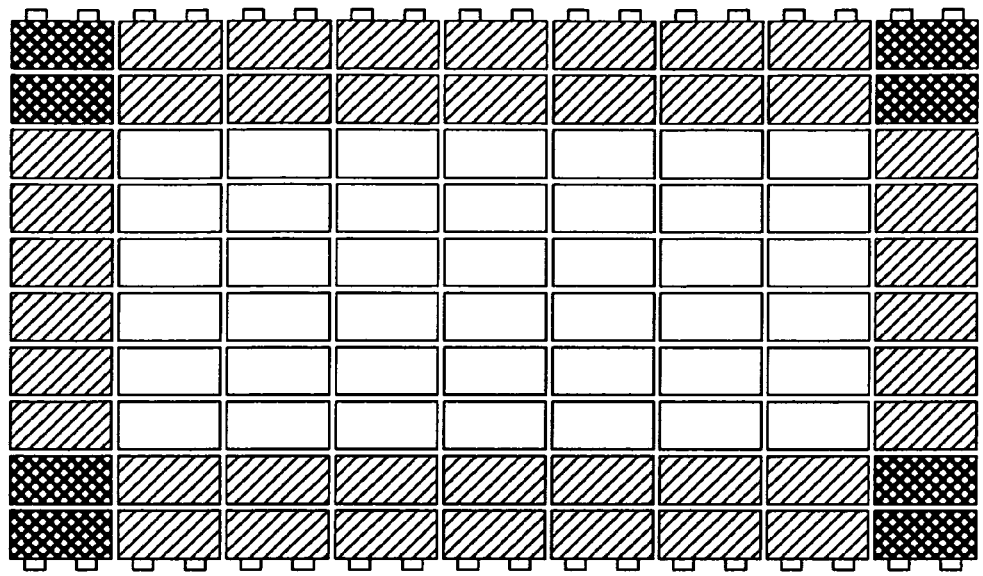
FIG. 6A is a plan view of a the solar module array in a basic rectangular formation.
Figure 6B:
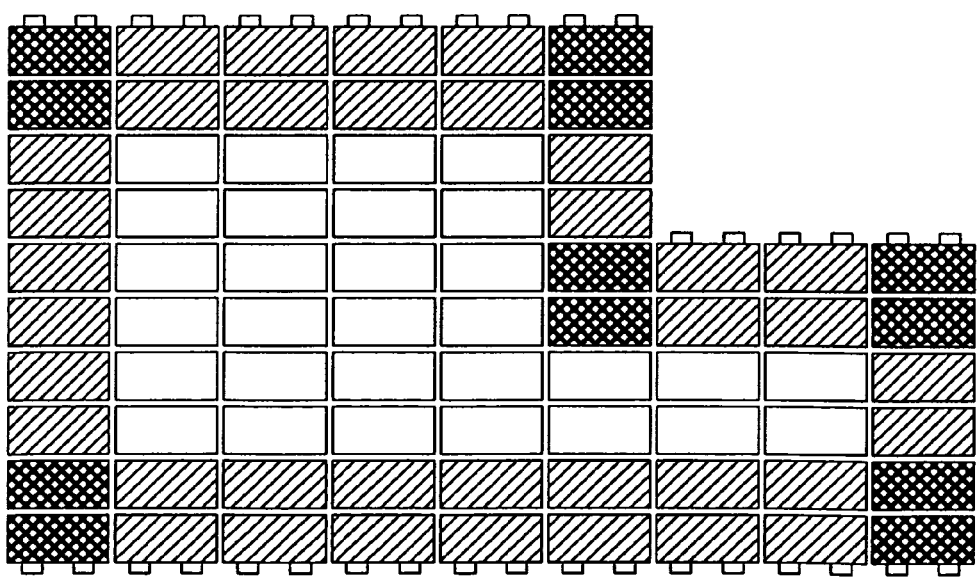
FIG. 6B is a plan view of a the solar module array in a geometric pattern having more than four corner areas.

For example, in a standard rectangular rooftop installation as illustrated in FIG. 6A, the strongest wind uplift forces are present at the corner panels (black checked rectangles). Since many installations must accommodate roof features such as HVAC equipment, vents, etc. many panel assemblies have more than four "corners", as shown in FIG. 6B. Moderate uplift forces are present along the edges (hashed rectangles), while the interior panels (white rectangles) experience relatively lower uplift forces. With this understanding of the relative wind forces at different sections, the mounting system can be constructed accordingly. For example, the long and short links can be constructed out of relatively heavy gauge steel for the perimeter panels, and from thinner (and hence cheaper) steel for the interior panels. The respective links can be color coded for easy identification by installation personnel.

Figure 7A:
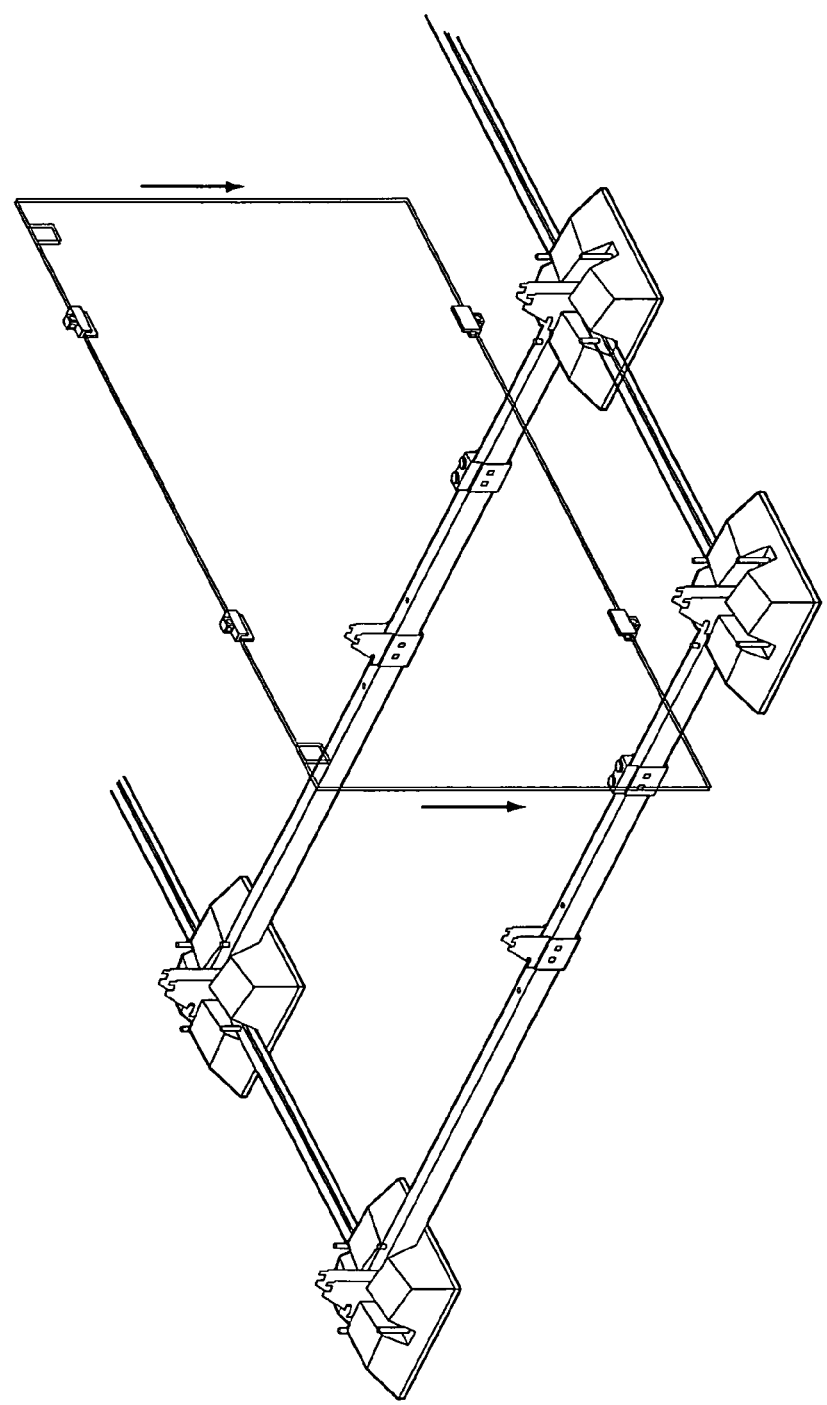
FIGS. 7A-7D illustrate the installation and mounting sequence for a solar panel into the mounting system of the present invention.
Figure 7B:
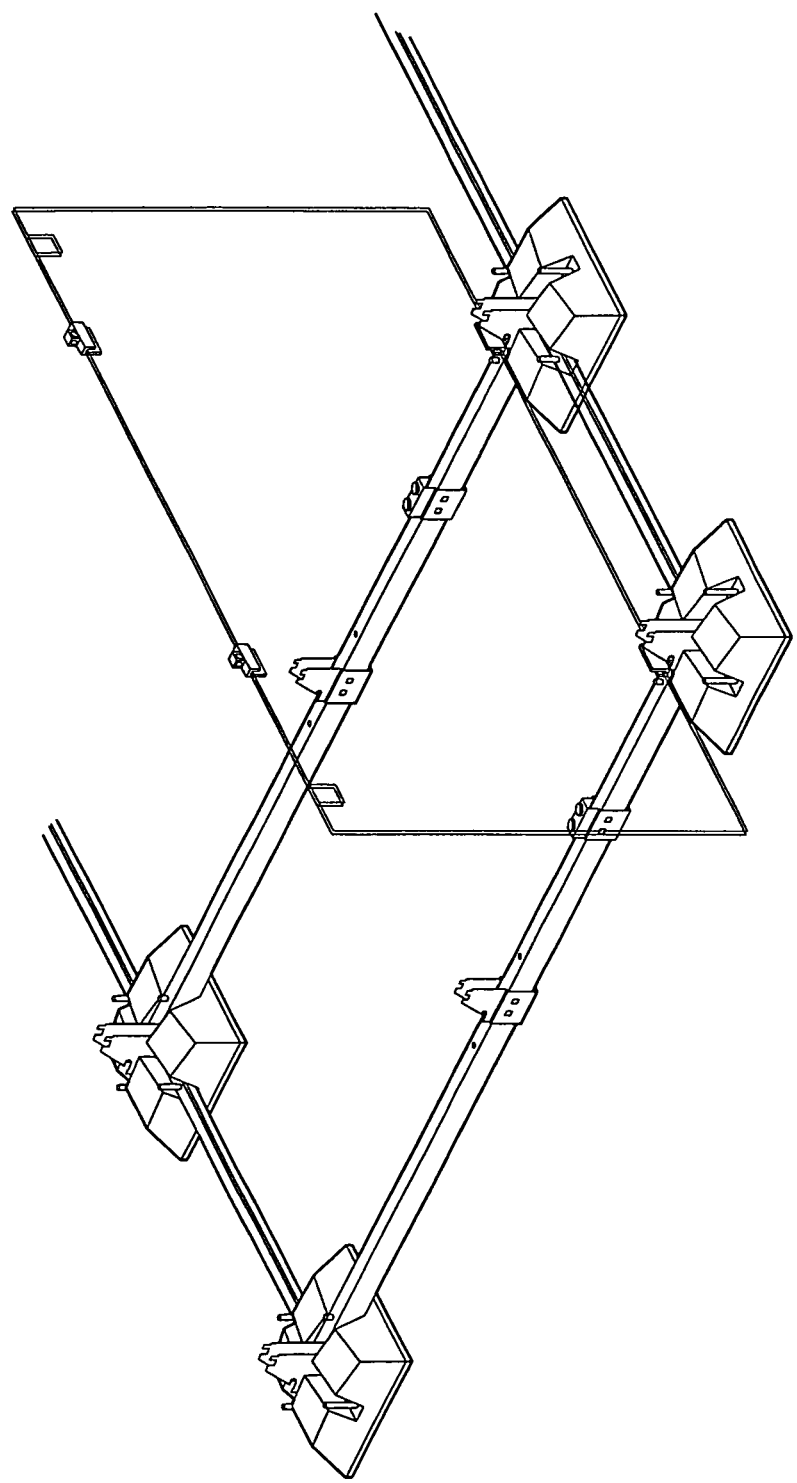
Figure 7C:
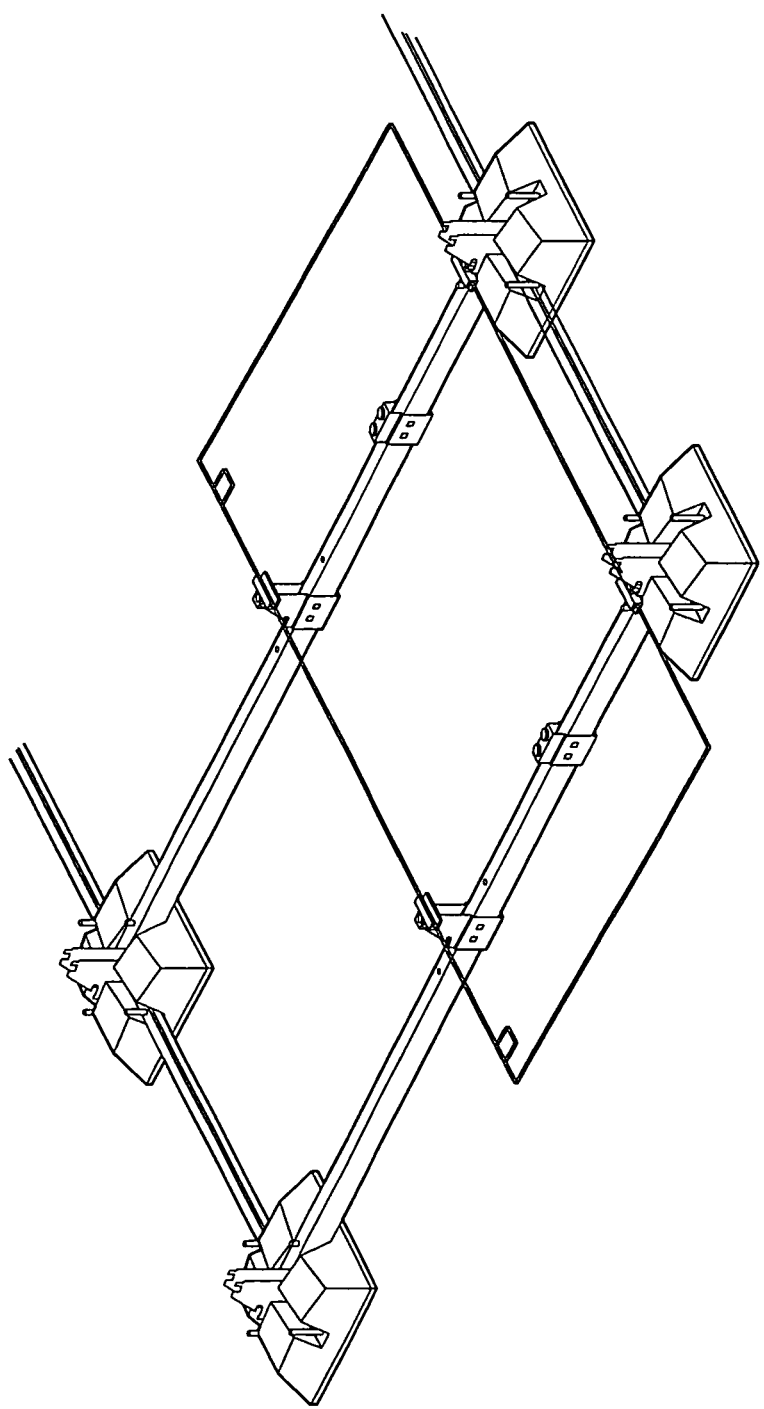
Figure 7D:
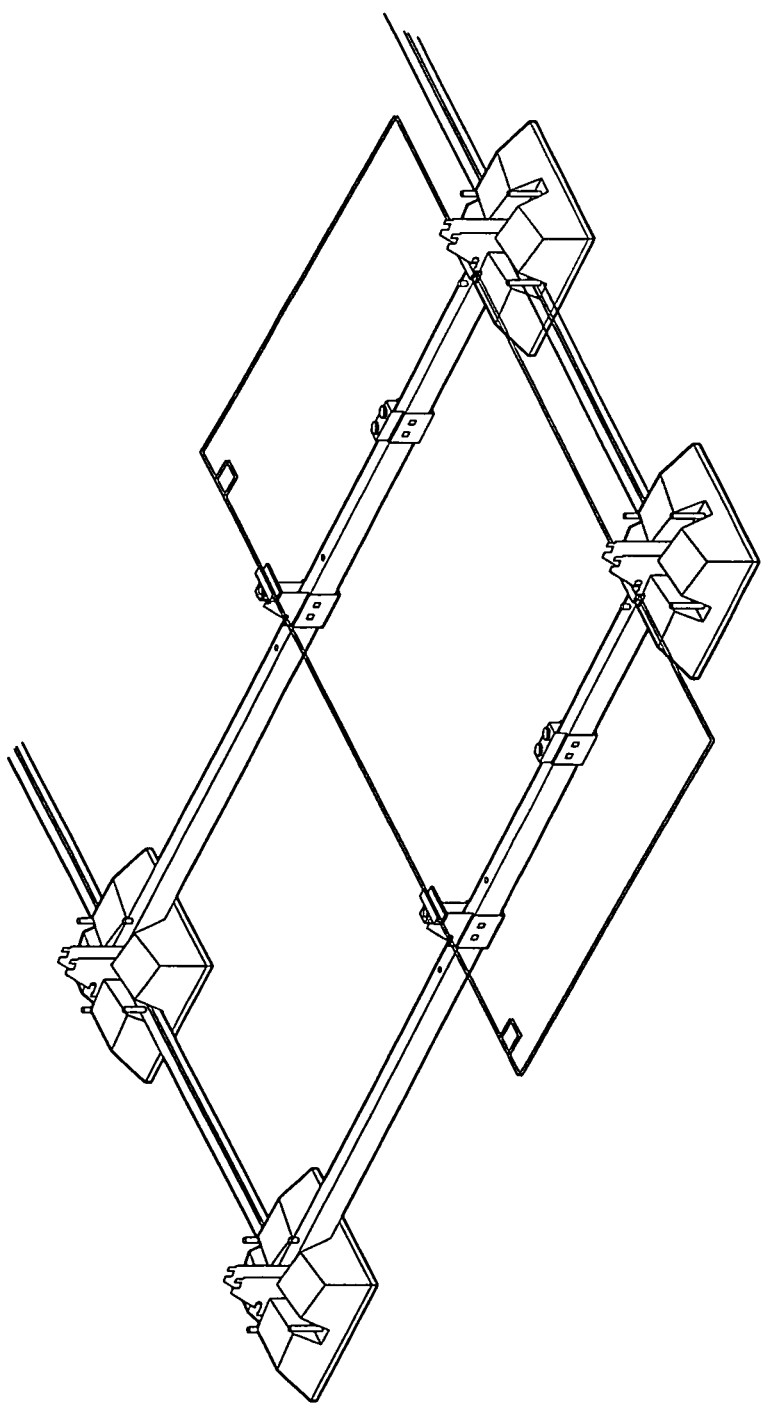

Once the four panel clamps are installed on a solar panel, the panel is lifted into position over two tilt brackets as shown in FIG. 7A. Next, the mounting posts of the panel clamps are aligned with the lower mounting openings in the front of each tilt bracket, and the panel is set into place, as shown in FIG. 7B. The panel is then lowered towards the two mid-link brackets as illustrated in FIG. 7C. Finally, the panel is slid forward into the tilt brackets, and then the panel clamps are aligned and set into the mid-link brackets (FIG. 7D). Note as described above, the lower mounting openings in the tilt brackets have enough depth to allow the panel to slide into the bracket, which helps lock the panel in place. A locking cap is then applied to the top of each mid-link bracket to lock the respective panel clamps in place.

Figure 8:
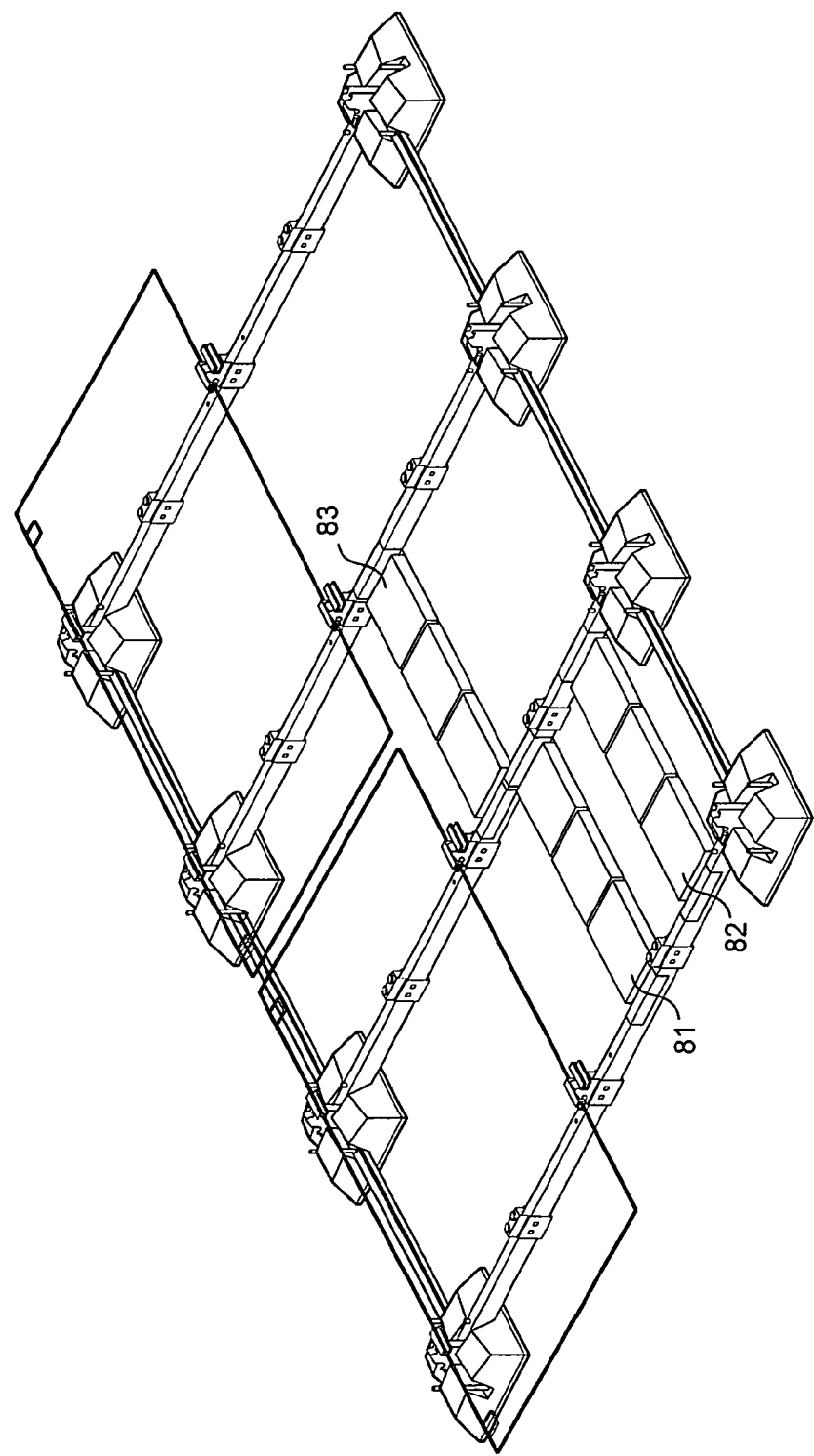
FIG. 8 illustrates the mounting of optional ballast pans onto the mounting system of the present invention.

If additional system ballast is needed for a particular installation, ballast pans 81, 82, 83, such as shown in FIG. 8, may be added to the system between adjacent long links. Ballast can then be placed in the pans 81, 82, 83 to provide additional weight to the system. Different arrangements and configurations of the ballast pans can be deployed as necessary.

In environments where the system may be subjected to significant loads, such as heavy snow, additional feet can be placed under to the mid-link brackets to provide additional support. In this configuration, the feet are not necessarily attached to the mid-link brackets, but provide additional load bearing support points for the system.

Figure 9:
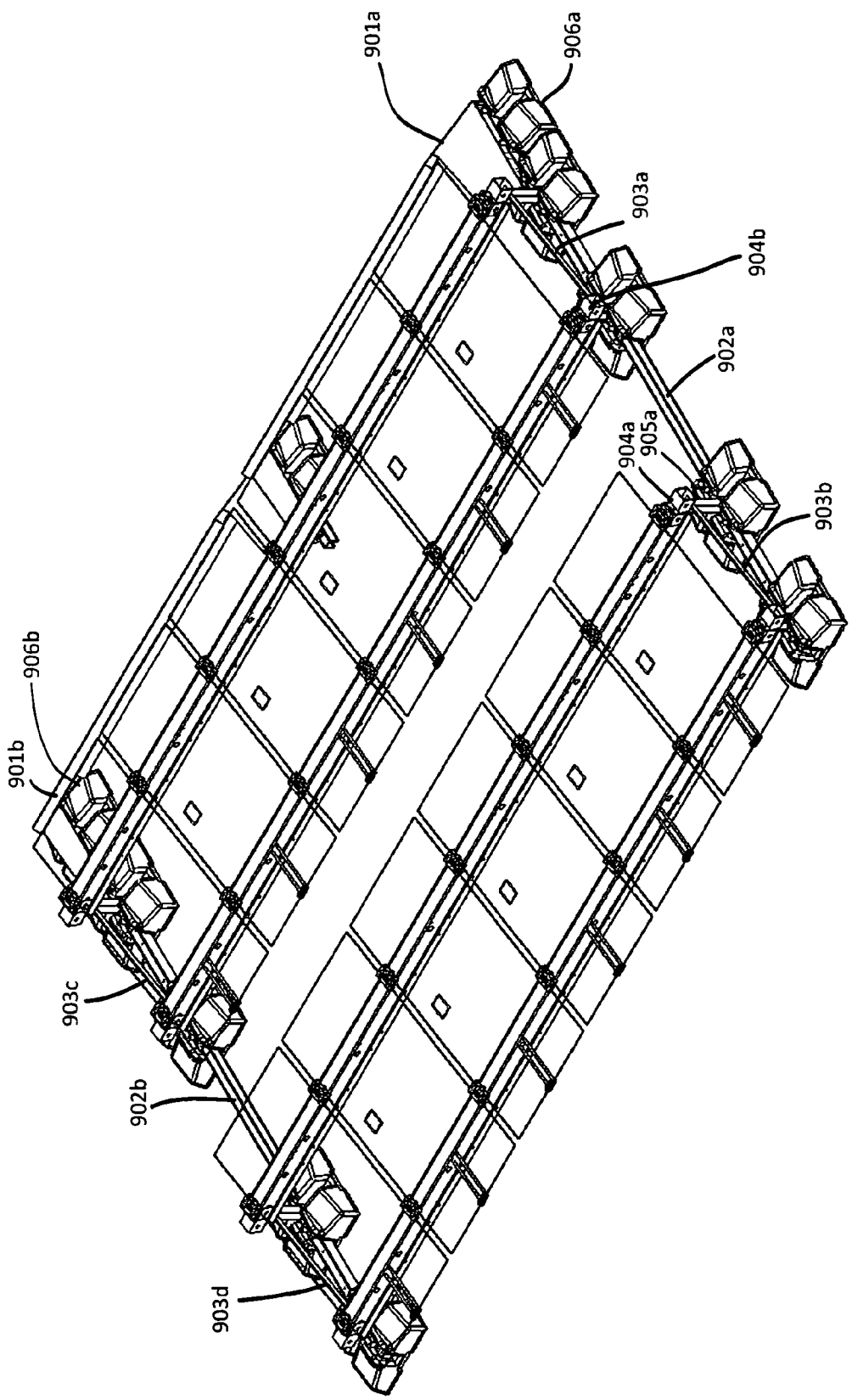
FIG. 9 illustrates an alternate embodiment of a module mounting system designed for use with laminate modules.

FIGS. 9-15 illustrate an alternate embodiment of a photovoltaic module mounting system (MMS). FIG. 9 shows an embodiment of a photovoltaic MMS designed for laminate PV modules. This figure illustrates rail brackets 903a-903d that positions the rails that run in an east/west direction. The rail brackets 903a-903d define the location of the rails for different module types, as different PV module manufacturers specify different discrete locations for clamping. The rail brackets 903a-903d also serve to complete a structure including a set of rails, rail brackets and feet. Additionally, the rail brackets 903a-903d are able to transmit forces in the north and south directions using shade links 902a, 902b. The shade links 902a, 902b define north/south row spacing between the PV modules. The shade links 902a, 902b can have different lengths in order to optimize the design of the entire PV system. In this embodiment the rail bracket 903a-903d is made from steel from a Weldment of parts.

Optionally, wind deflectors 901a, 901b may be attached to the PV module assembly to deflect wind forces. In this embodiment, the wind deflectors are assembled to an additional foot 906a, 906b on each end.

Figure 10:
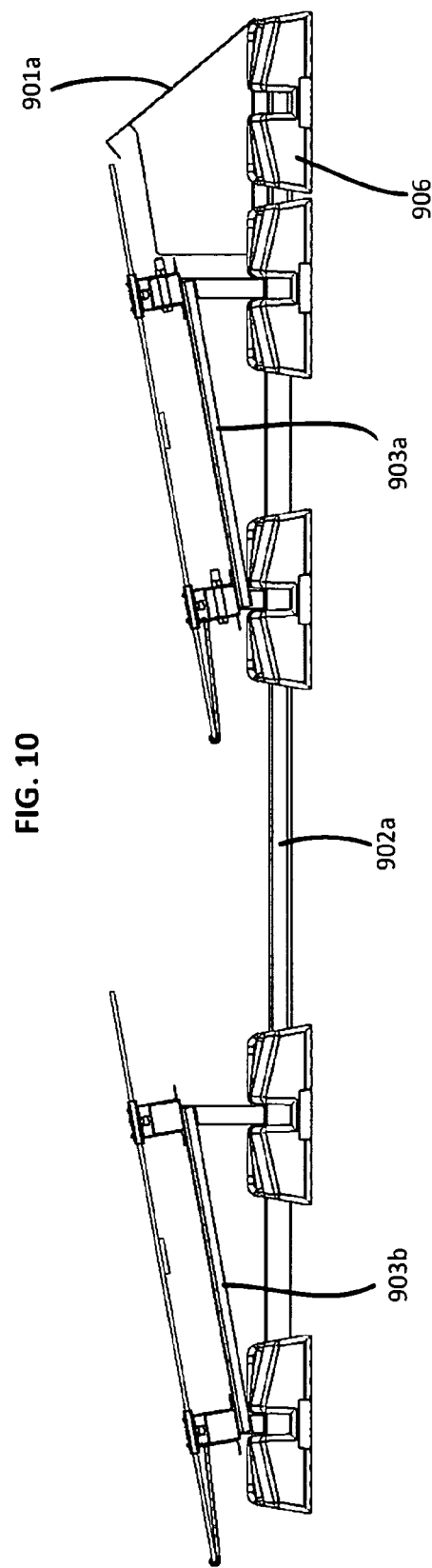
FIG. 10 is a side elevation view of the system of FIG. 9.

FIG. 10 is a side elevation of the MMS system of FIG. 9.

Figure 11:
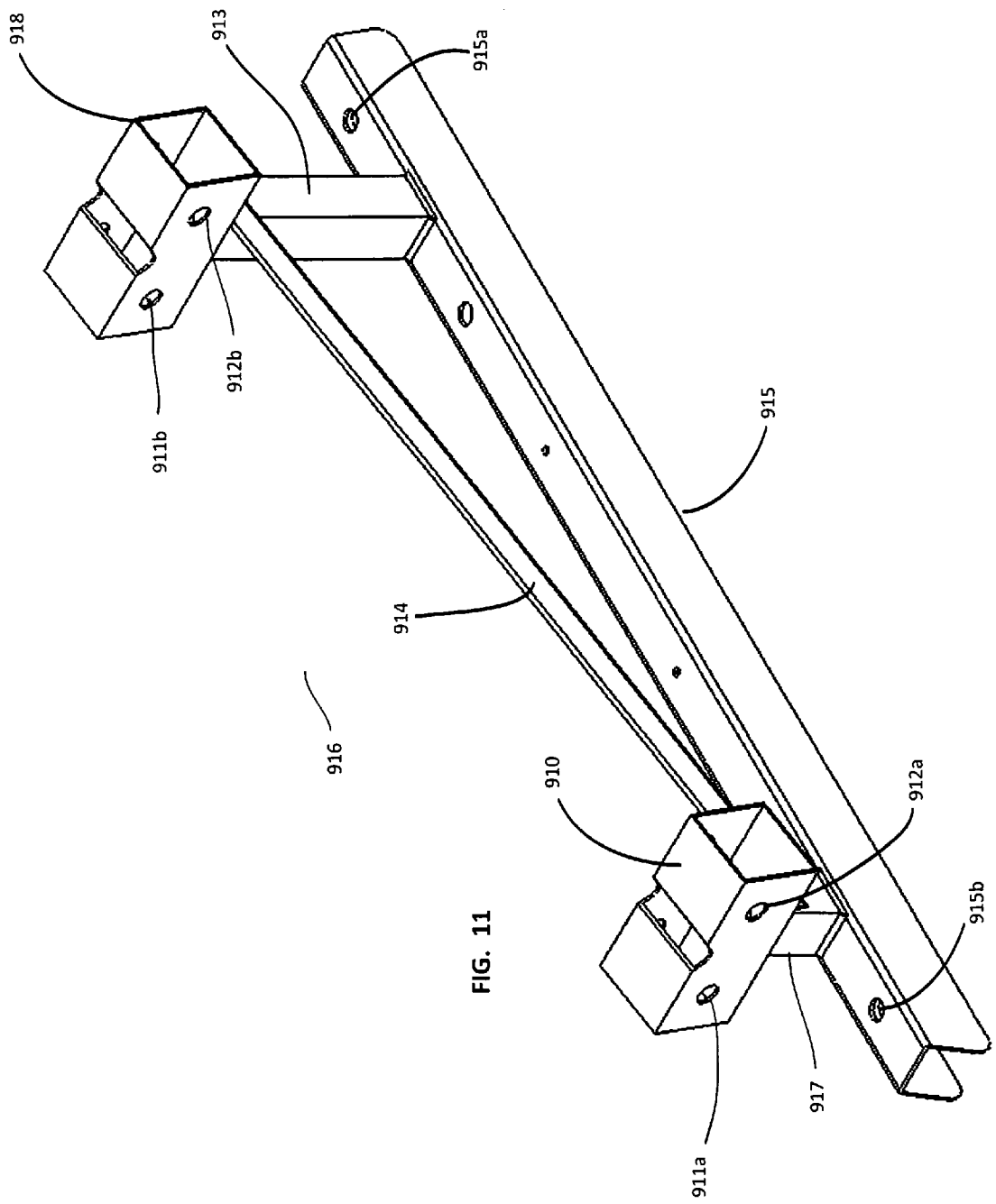
FIG. 11 is a side isometric view of a rail bracket according to one embodiment of the invention.

FIG. 11 illustrates a detailed isometric view of a rail bracket 916. In this embodiment, the rail bracket 916 is made from metal, and is created as a weldment subassembly. The rail bracket 916 is custom made for each different type of laminate module in order to accommodate different laminate PV module sizes as well as different tilt angles. The rail bracket 916 includes a main link 915, a northern post 913, a southern post 917, and beam 914. Tilt angles are varied by setting the northern post 913 height relative to the southern post 917 height. The northern 913 and southern 917 posts are joined by beam 914 that is for structural rigidity. The features that join the rail to the rail bracket are shown as a square tube 910, 918. The square tubes 910, 918 have an east hole 912a, 912b and a west hole 911a, 911b, respectively, that receive a pinned connection from a rail. It is preferred that the rail bracket is able to accept two adjacent rails in order to form a continual east/west installation of panels. The pin feature allows for one rail to move relative to an adjacent rail for roof following. The rail bracket assembled to a northern foot using the a hole feature 915a that accepts a bolt from the northern foot assembly. Likewise a southern hole 915b, accepts a bolt from the southern foot.

Figure 12:
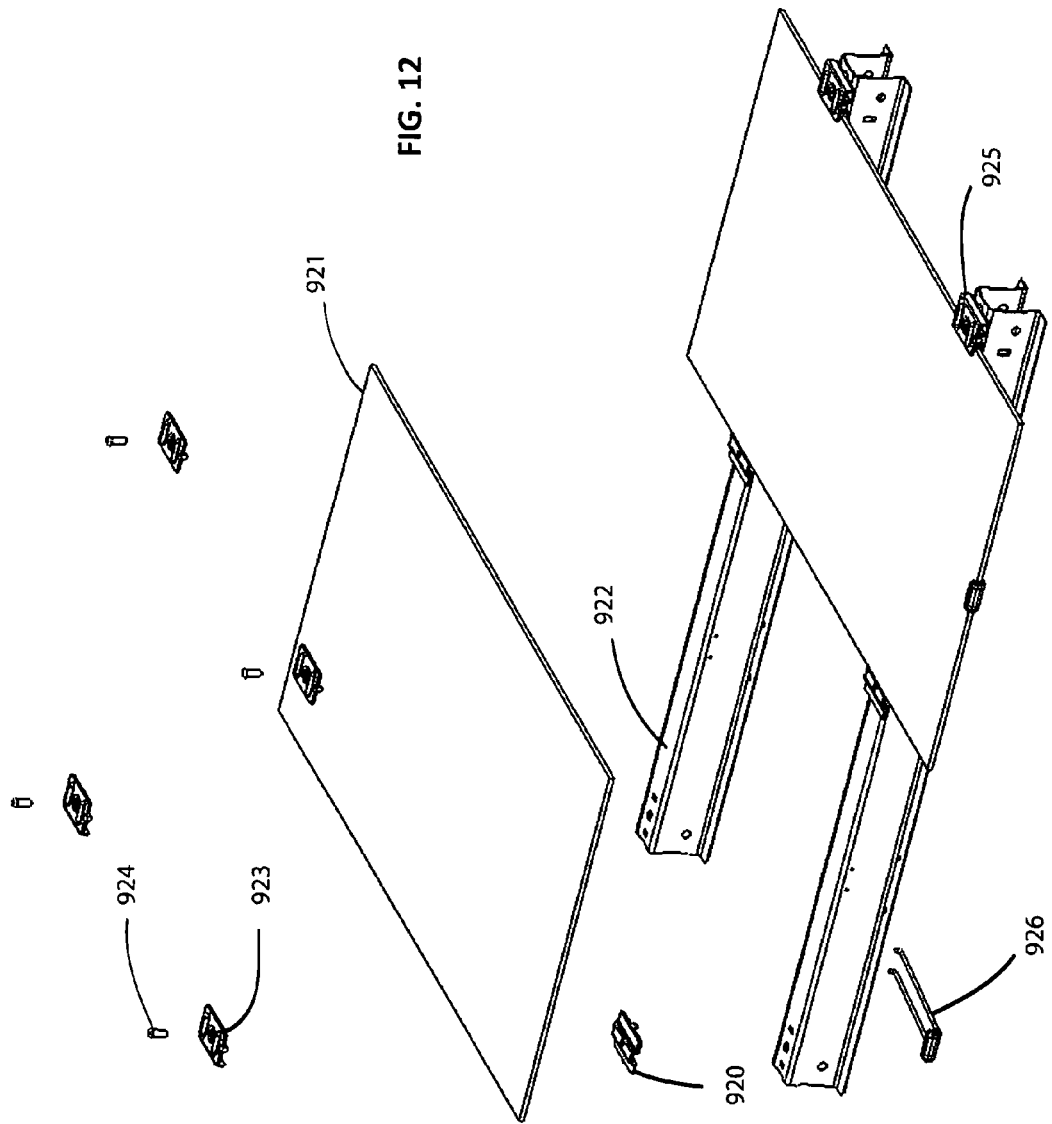
FIG. 12 illustrates a laminate module being assembled to the mounting system of FIG. 9.

FIG. 12 illustrates how laminate PV modules are assembled to the MMS. Preferably, the PV modules can be assembled quickly and safely to the rails. This embodiment shows a module bottom clamp 920 that contains an elastomer, or soft durometer plastic, that will safely secure the laminate panel. The bottom clamp 920 uses location features, such as hole and/or tabs to grossly locate the PV laminate module 921 to the rail 922 in the desired location. Once all of the bottom clamps are placed on the rail, the laminate PV modules are placed on the bottom clamps and then a top clamp 923 is placed on top of the bottom clamp 920 and secured using a fastener 924. The fastener 924 may be a bolt which attaches to a "clinched" in rev-nut (not shown) on the rail. Alternately, the bolt may clinched into the rail and the clamp attached with a nut. In this embodiment, there are two types of top clamps, one for an interior clamp that clamps two PV laminates at once, and one for an end clamp 925 that only clamps one module.

It is desirable to prevent a PV module from sliding out of its desired installation location, specifically for larger tilt angled areas such as 5° and 10° tilt angles. A PV module hook 926 is a hook designed to fit into the rail 922 easily and securely and be able to prevent the PV module from sliding southward during installation, or over time. In this embodiment, the PV module hook 926 is made from a stainless steel wire that is formed in an appropriate three-dimensional shape that will engage and hook into the rail, as well as having a returned feature in the wire that accepts an elastomeric material such as EPDM in order to secure the PV module glass without causing damage. The PV module hook 926 could be manufactured from sheet material, extruded from aluminum, or injection molded from thermal plastic.

Figure 13:
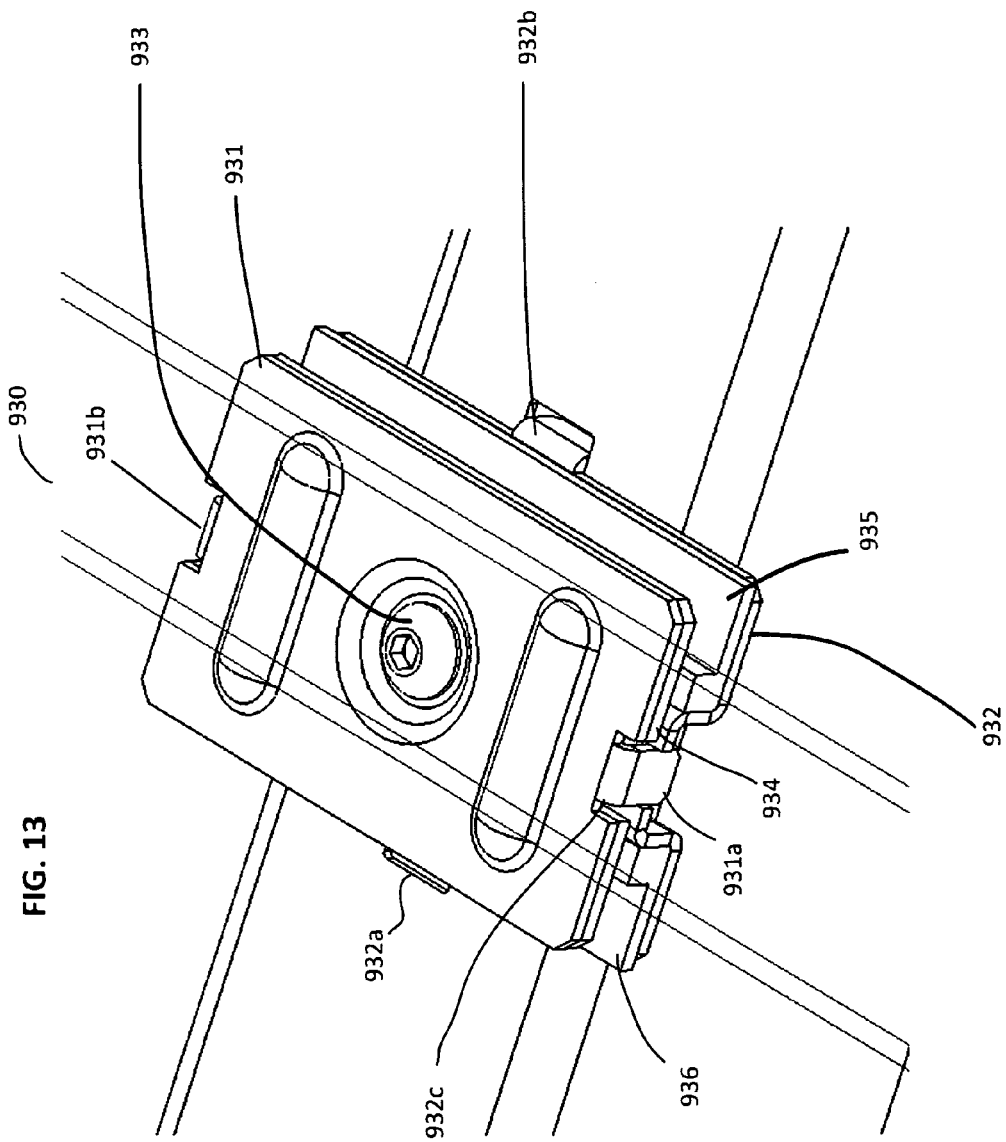
FIG. 13 illustrates a clamp for mounting the modules to the mounting system, according to a preferred embodiment of the present invention.

FIG. 13 illustrates an embodiment of a PV module clip 930 according to one embodiment of the present invention. The PV module clip 930 comprises an upper clip 931 and a lower clip 932. Preferably, the upper clip 931 is separate from the lower clip 932 for quick and versatile assembly of the PV modules to the racking components. The upper clip 931 and lower clip 932 each have elastomeric pads 934 and 935, 936 respectively. The pads 934, and 935, 936 are adhered to clips 931, 932 such that a PV module laminate may be safely secured between a lower elastomeric pads 935, 936 and an upper elastomeric pad 934. A fastening element 933 is used to secure the upper and lower clips elements 931, 932 together.

It is also preferred to be able to quickly distinguish between an upper clip and a lower clip, while preventing the clip assembly from rotating when securing it to the racking component with a fastener. For arresting rotation between the upper and lower clips, the upper clip 931 may have a tongue feature 931a, 931b that locates to the lower clip 932 in between a cut out 932c. For both ease of assembly and preventing rotation between the racking components and the lower clip, a tongue 932a, 932b may be used to locate to a cut out slot located in the racking component (as shown).

Figure 13A:
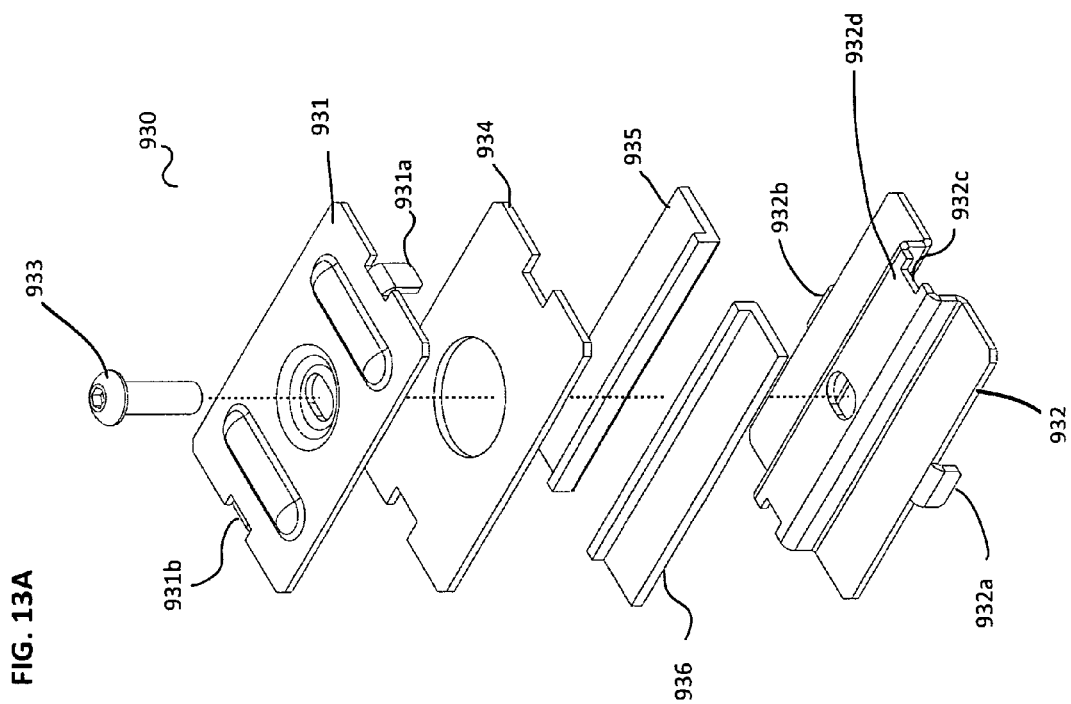
FIG. 13A is an exploded view of the clamp of FIG. 13.

FIG. 13A illustrates an exploded view of the clip of FIG. 13. Note that there are two elastomeric pads 935, 936 on the lower clip 932. Also, the lower clip 932 is preferably formed with a ridge 932d to space apart adjacent photovoltaic modules.

Figure 14:
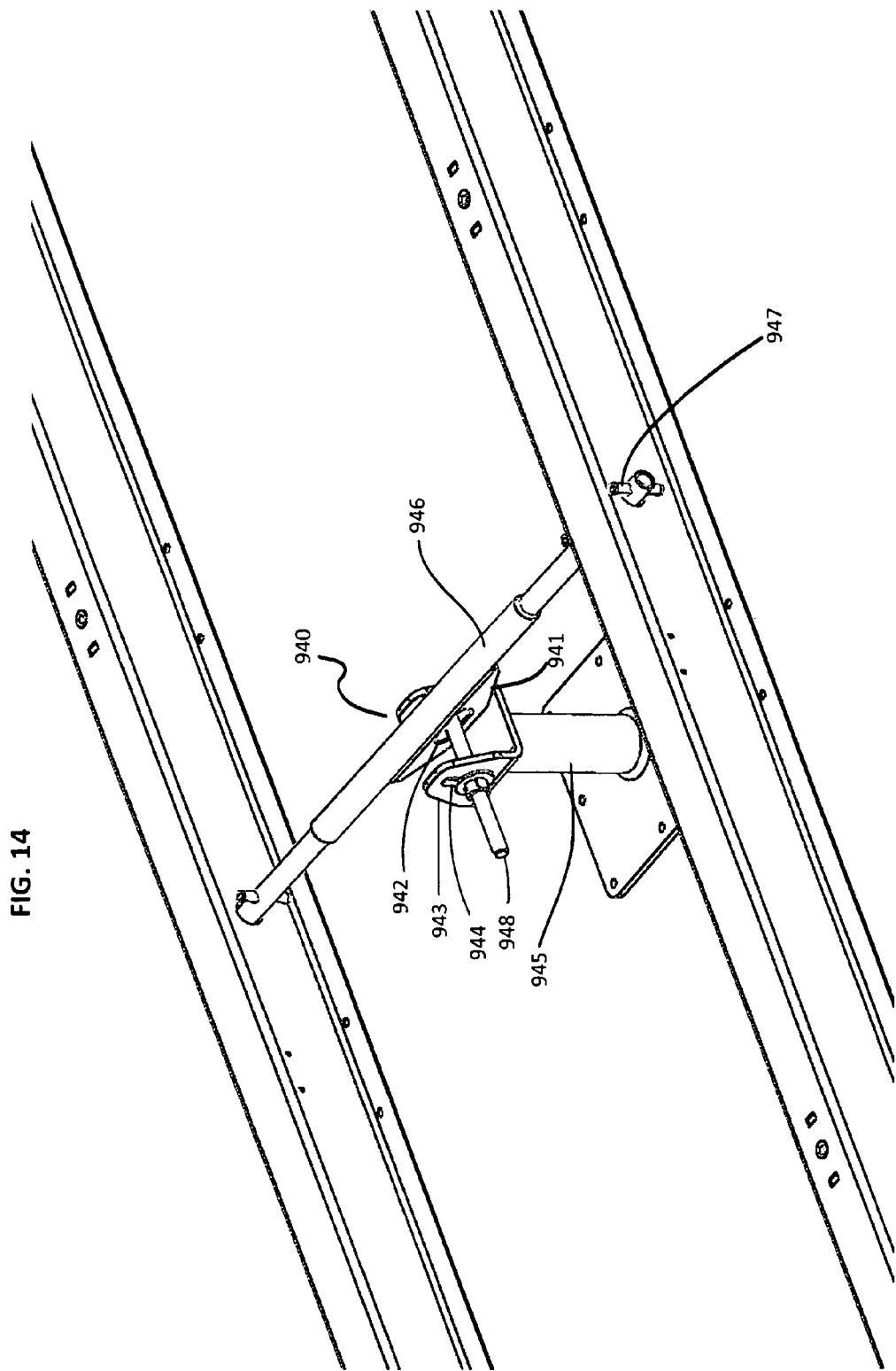
FIG. 14 illustrates a roof penetrating attachment that may be used with the mounting system of FIG. 9.

FIG. 14 shows detail of a roof penetrating attachment 940 that can be used with the present invention. A post 945 is secured to a roof membrane that is capable of being flashed, and therefore sealed adequately from the environment. A bracket 943 that connects the post 945 to the MMS uses a vertical slotted connection 944 for height, or Y axis, adjustment during assembly. The bracket 943 has two vertical slots (only one shown 944). A rod 946 has a horizontal slot 942 that allows for north/south adjustment. A locking member, such as a pin or bolt 948 secures the rod 946 to the bracket 943. This maximizes the likelihood that the roof penetrating attachment 940 can be assembled to the rails of the MMS. In this embodiment, a spring pin 947 is used to secure the rod in place relative to the rail. Spring pins are used on both sides of the rails in this embodiment to ensure a secure connection between the roof penetrating connector 940 and the MMS (i.e. four pins for each rod).

Figure 15:
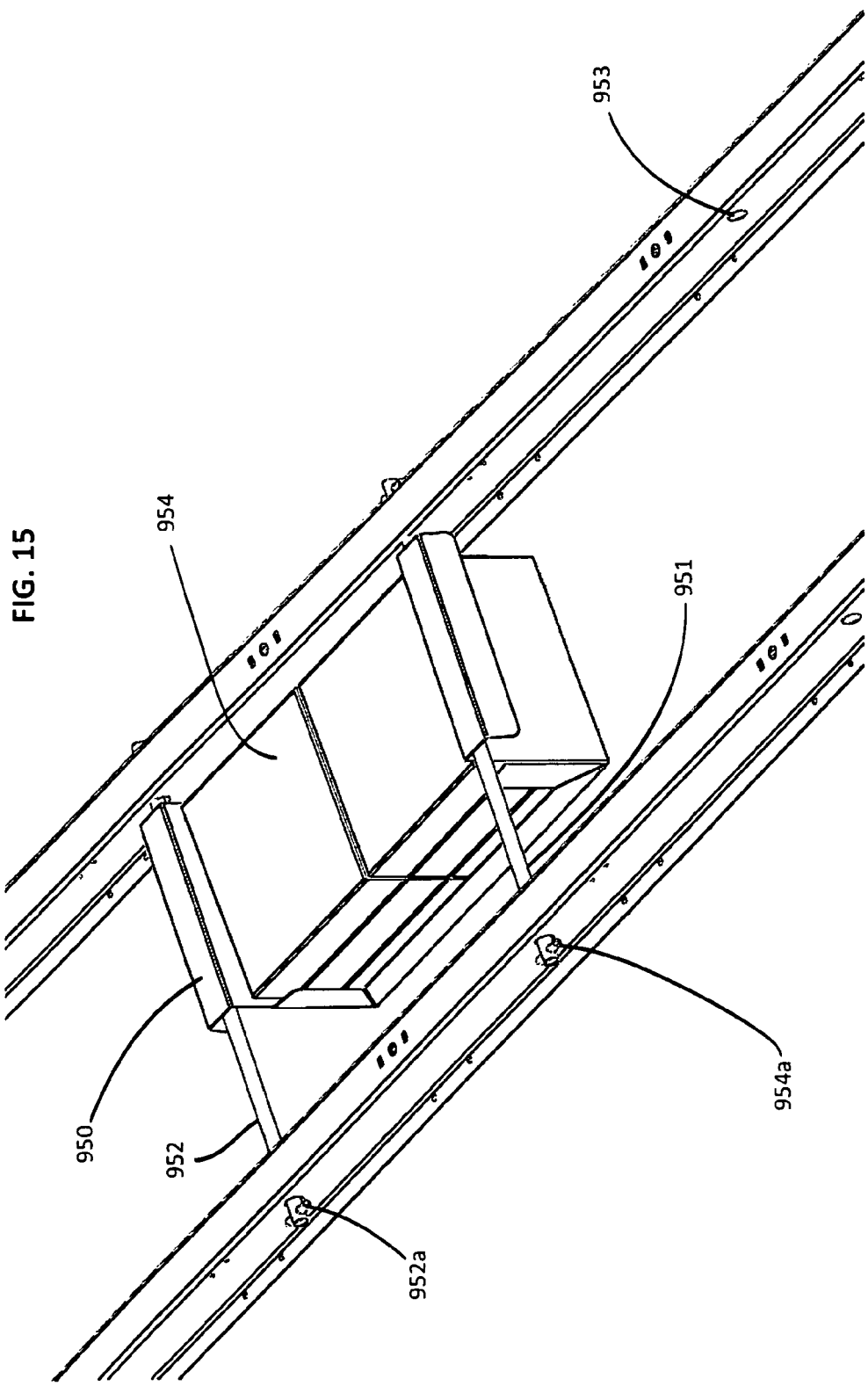
FIG. 15 illustrates a ballast pan that may be used with the mounting system of FIG. 9.

FIG. 15 illustrates a detailed isometric view of a non roof penetrating ballast pan, which may be used with the present invention. A ballast pan 950 is located between an east rod 951 and a west rod 952, each of which are positioned through hole 953 located at discrete positions along the rail. The ballast pan 950 can be a generally rectangular open pan for holding weighted elements 954, such as concrete blocks. It is desirable to have multiple hole locations on the rail to maximize the placement of ballast pans over structural members of a roof. The rods 951, 952 are secured to the rails using spring pins 951a, 952a, that have been optimized for adequate strength and ease of assembly.

Figure 16:
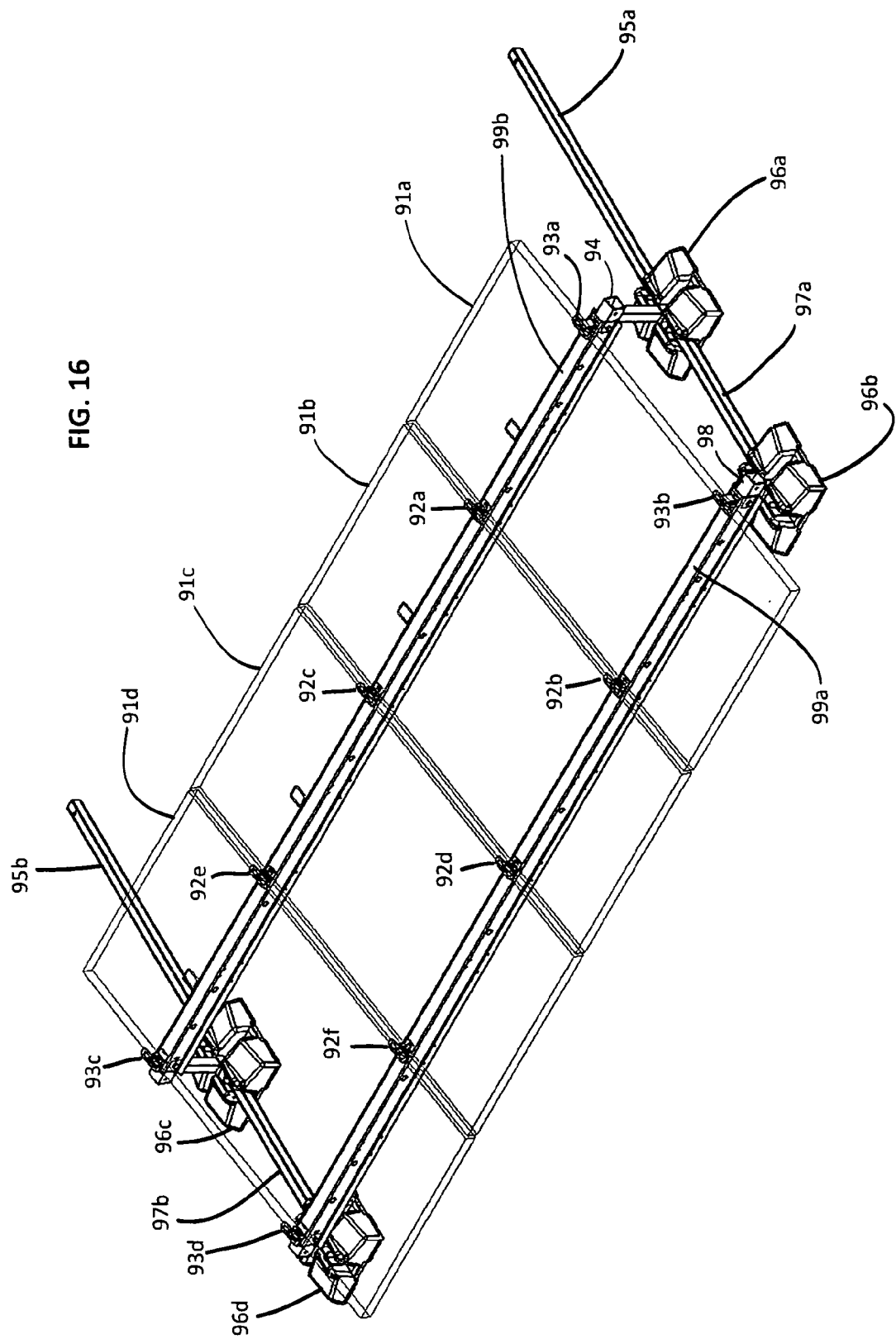
FIG. 16 illustrates an embodiment of the present invention designed to accommodate framed crystalline photovoltaic modules.

FIGS. 16-23 show an alternate embodiment of a Photovoltaic Module Mounting System (MMS) designed to accommodate crystalline framed PV modules. In other words, the teachings and advantages of the present invention may be applied to framed modules as well, using a similar mounting structure and clamp assembly as described above. However, in this embodiment, the frame of the PV module substitutes for a separate rail link component. In other words, the PV module frame acts as part of the mounting structure. As shown in FIG. 16, the framed PV modules 91a-91d are secured to the MMS using an interior top clamps 92a-92f, attached to rails 99a, 99b. The rails 99a, 99b define the actual PV module spacing with gross location features as well as providing attachment points for securing the top clamps 92a-92f. For the interior top clamps 92a-92f, it is preferable that each top clamp acts to secure two adjacent PV modules. On the exterior, end top clamps 93a-93d are used to secure the PV modules to the MMS. The "northern rails" 99b are secured to the substructure of the MMS using a northern rail bracket 94. The northern rail bracket 94 is used to secure the rails, while providing structure and defining the appropriate tilt angle and desired clamping between the PV modules and the rails. In a preferred embodiment, a "southern rail" bracket 98 secures the southern rail 99a to the structure. The substructure of the MMS comprises rubber mounting feet 96a-96d. The rubber feet 96a-96d receive a rail bracket link 97a-97b that is cut to length, depending on the size of the PV modules. In order to define north/south row spacing between PV modules a shade link 95a, 95b is used to secure each panel while establishing the appropriate distance between rows. The shade links 95a, 95b can have different lengths in order to optimize the design of the entire PV system. This embodiment illustrates a rail made from steel and is roll formed with pre-punched features. It is also possible to reproduce the rail using a break forming process as well.

Figure 17:
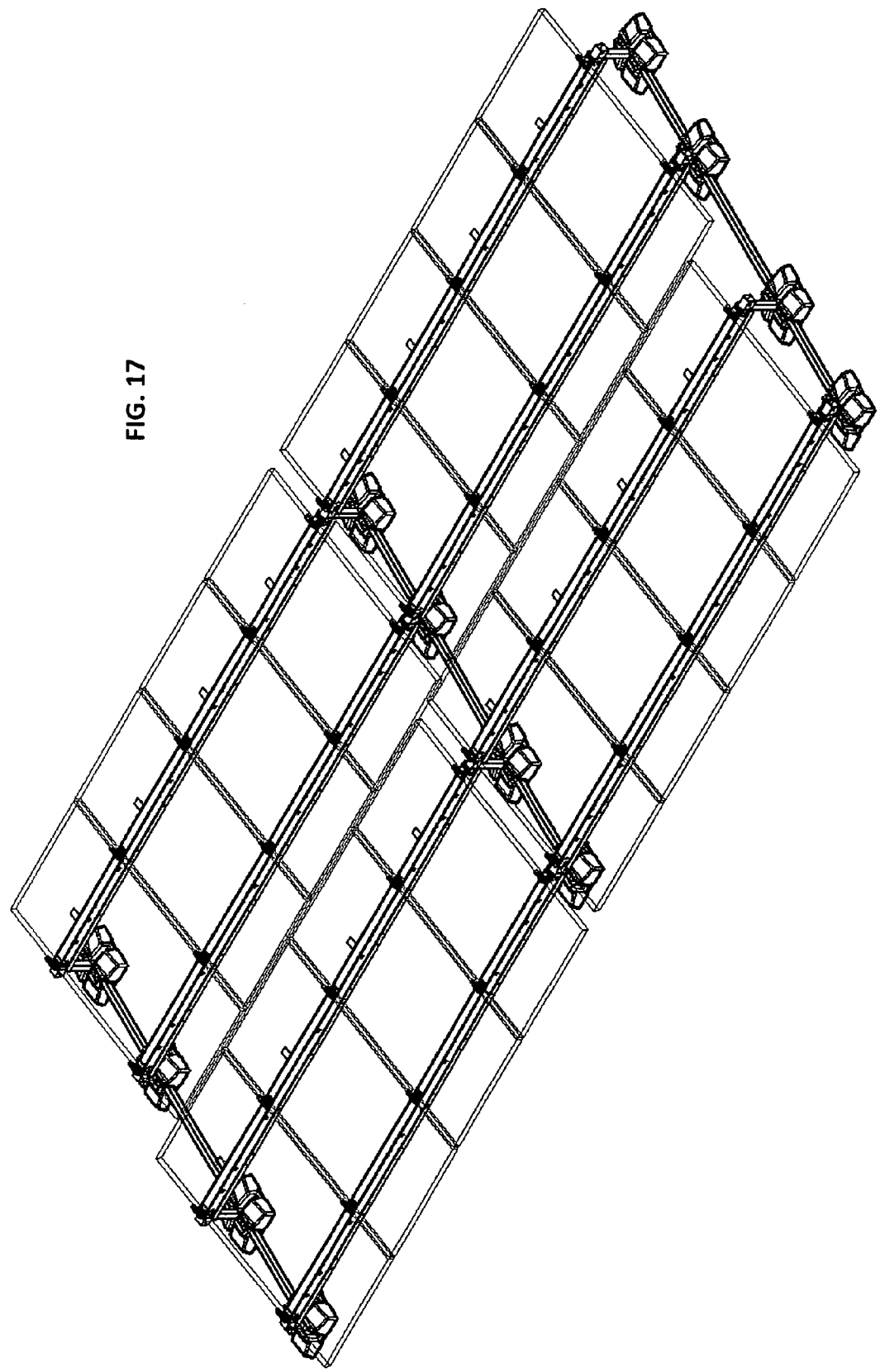
FIG. 17 illustrates four panel assemblies interconnected according to the present invention.

FIG. 17 shows four sub-assemblies of the PV framed crystalline MMS of FIG. 16 interconnected into an array. This embodiment is able to link the modules together in both north/south and east/west directions.

Figure 18:
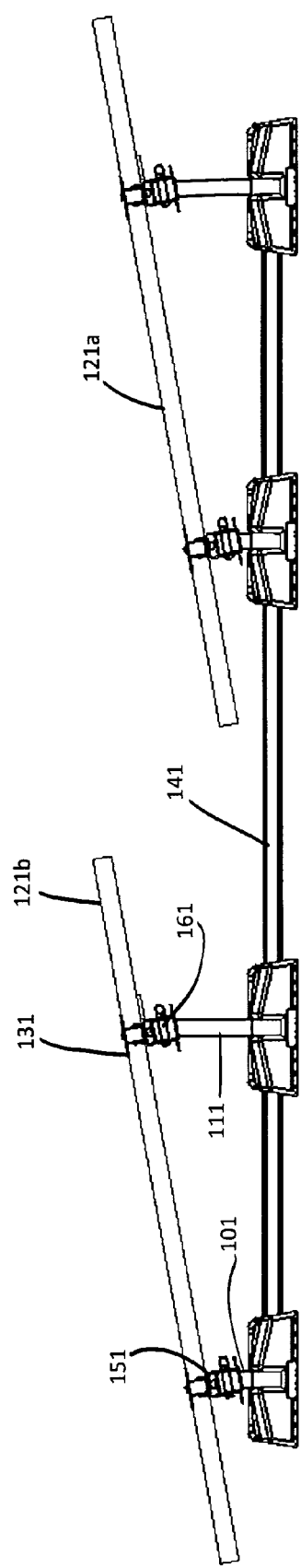
FIG. 18 is an elevated side view of the system of FIG. 17.

FIG. 18 shows the MMS pictured in FIG. 2 in an elevated side view orientation and shows a framed crystalline PV module 121b, secured to the MMS using an end top clamp 131. The northern rail 161 is secured to the northern rail bracket 111, and the southern rail 151 is secured to the southern rail bracket 101. The northern panel 121a and southern panel 121b are connected through a shade link 141.

FIG. 19 illustrates in greater detail a side elevation of the southern rail bracket 101 shown in FIG. 18. The framed PV module 180 is shown secured to the southern rail 170 using a top end clamp 190. In this embodiment, it is preferred to use a fastener 200, to secure the top end clamp 190 to the rail 170. The southern rail 170 attaches to the southern bracket 210 using the geometry of the components and holes to align them. The southern rail 170 is then secured to the southern rail bracket using a fastener (bolt) 150, and nut 160. It is preferred to connect a rail to a rail bracket using one fastener, as this will act as a pivot along the east/west direction. It also allows the structure to accommodate any roof variations, or discrepancies with roof flatness between modules. In this embodiment, the rail brackets join two adjacent rails and act as mechanism to place and secure additional panels in the east/west direction.

FIG. 20 depicts a close up isometric view of a top clamp 220, assembled to an interior bottom clamp 240 using a fastener 230. In a preferred embodiment, the interior bottom clamp 240 is capable of grounding the framed PV module using a grounding tab 240A to break the annodization typically found on PV frames such that a secure electrical connection can be formed between the PV module frame and the sub structure. The interior top clamp 220 is preferably made from stainless steel in this embodiment and reproduced using a sheet metal manufacturing process. The interior top clamp 220 has guide features that engage with the interior bottom clamp 240 to guide and prevent rotation when tightening the top clamp 220 to the PV module frame. In this embodiment, the interior bottom clamp 240 is made from a thermal plastic and is molded or formed. The interior bottom clamp 240 contains slots or features that receive the guide features on the interior top clamp. FIG. 20A shows the same view of the interior top and bottom clamp prior to installation. The interior top clamp 220 is positioned above the PV modules and the interior bottom clamp 240 and will be secured to the rail using fastener 230. The compressive force of the fastener secures the top clamp 220 to the PV module through the interior bottom clamp 240, which is screwed into the rail.

Figure 21:
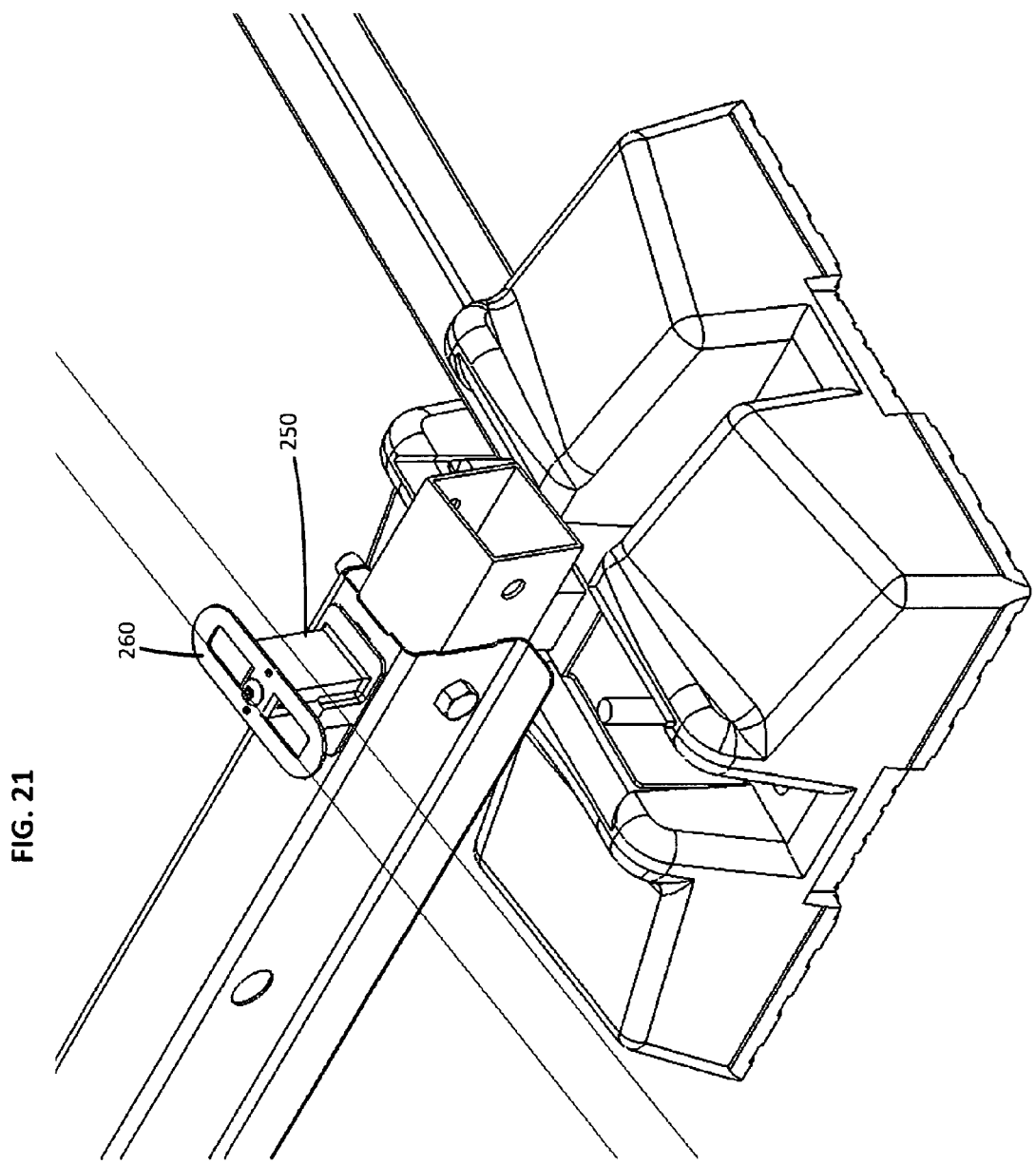
FIG. 21 illustrates a detailed isometric view of a southern foot, according to an embodiment of the present invention.

FIG. 21 illustrates an isometric detailed view of a southern foot. This is considered an exterior case as it is located at either end of a panel; therefore a top clamp 260 is assembled to an exterior bottom clamp 250.

Figure 22:
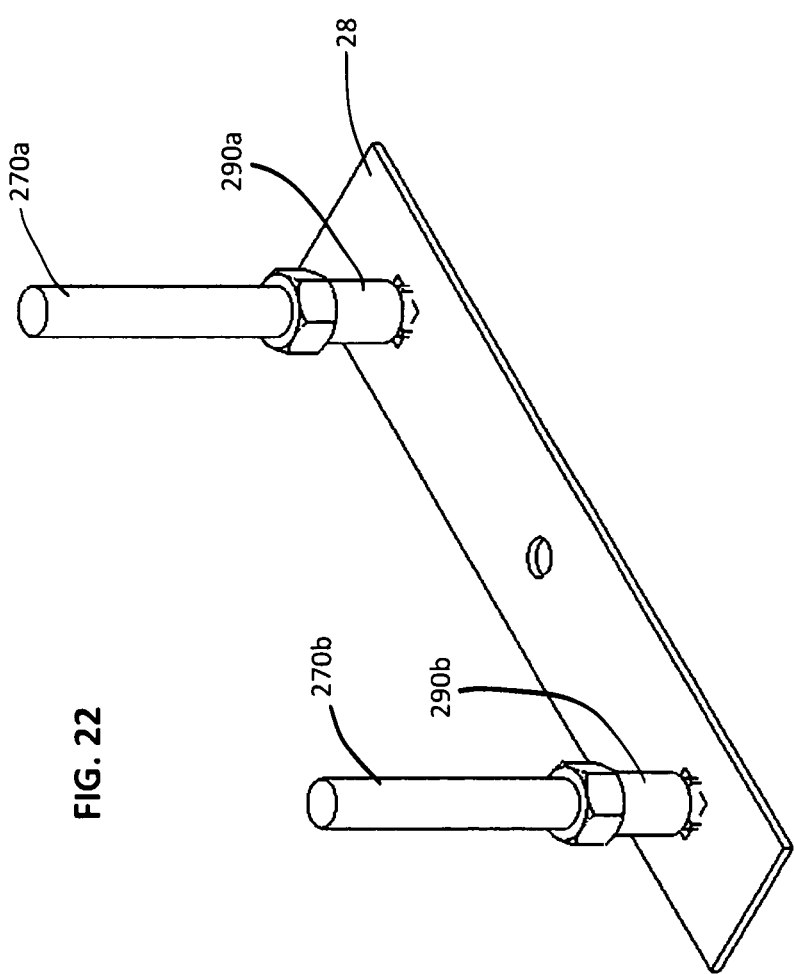
FIG. 22 illustrates components of the foot of FIG. 21.

FIG. 22 shows an isometric view of components that are located inside of a rubber foot. In this embodiment, a metal strap 280, with cutouts that receive a carriage bolts 270a, 270b, such that the carriage bolts 270a, 270b are prevented from rotating by the strap. It is preferred to use a spacer 290a, 290b to resist compression of the rubber foot when an installer tightens the nuts used to secure the rail bracket link to the rubber foot. It is preferred that this assembly contains mirrored features so that linkage assemblies can be installed in both north and south directions in conjunction with the rail brackets and rail bracket links.

FIGS. 23 and 23A illustrate an alternate embodiment of the clip for use with framed panels. The upper clip 220 is similar to the prior embodiments, but the base 245 is formed from thermal plastic.

As noted above, the clamps of FIGS. 20, 20A, 23, and 23A may attach to the rails via bolts which fasten to clinched rev-nuts formed into the rails.

Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. A photovoltaic module mounting system comprising:
    a first rail bracket connected to a first set of two feet;
    a second rail bracket connected to a second set of two feet;
    a first rail connected to the first and second rail brackets;
    a second rail connected to the first and second rail brackets; and
    a plurality of clamps attaching at least one photovoltaic module to the first and second rails;
    wherein each first and second rail bracket comprises:
        a main member;
        a first post attached to a first end of the main member;
        a second post attached to a second end of the main member; and
        a beam connected between the first and second posts.

2. The mounting system of claim 1, wherein each first and second rail bracket further comprises:
    a first square mounting tube on top of the first post; and
    a second square mounting tube on top of the second post.

3. The mounting system of claim 2, further comprising a first shade link connected between the first set of feet and a third set of feet, and a second shade link connected between the second set of feet and a fourth set of feet, wherein the shade links attach the mounting system into an integrated array of photovoltaic modules.

4. The mounting system of claim 3, further comprising a wind deflector along an edge of the at least one module.

5. The mounting system of claim 2, wherein each clamp comprises:
    an upper clamp;
    an upper elastomeric pad;
    a lower clamp having a ridge;
    first and second lower clamp elastomeric pads formed to align along each side of the ridge in the lower clamp; and
    a fastener to attach the upper and lower clamps, wherein the upper and lower clamp pads are compressed against a photovoltaic module to secure the module in place.

6. The mounting system of claim 2, wherein the second post is longer than the first post.

7. The mounting system of claim 2, wherein a roof penetrating attachment is connected to the first and second rails.

8. The mounting system of claim 7, wherein the roof penetrating attachment comprises:
    a post;
    a bracket attached to a top of the post, the bracket comprising two spaced vertical slots;
    a rod having a horizontal slot; and
    a locking member attached through the two vertical slots of the bracket and through the horizontal slot of the rod.

9. The mounting system of claim 2, further comprising a ballast pan attached between the first and second rails.

10. The mounting system of claim 9, wherein the ballast pan comprises:
    a first rod connected between the first and second rails;
    a second rod connected between the first and second rails; and
    a pan attached to the first and second rods.

11. A photovoltaic module mounting system for mounting framed photovoltaic panels, the system comprising:
- a first set of two feet comprising a first foot and a second foot, each first foot and second foot in the first set having a first post;
- a second set of two feet comprising a third foot and a fourth foot, each third foot and fourth foot in the second set having a second post;
- a first rail link attached to the first foot and the third foot;
- a second rail link attached to the second foot and the fourth foot;
- a first rail attached to two first posts;
- a second rail attached to two second posts;
- a plurality of photovoltaic modules having metal frames positioned on the first and second rails; and
- a plurality of clamps attaching the metal frames of the photovoltaic modules to the first and second rails;
- wherein the second posts are taller than the first posts.

12. The mounting system of claim 11, further comprising: a shade link connected to each of the second feet.

13. The mounting system of claim 12, wherein the shade links interconnect the module mounting system in an integrated array of photovoltaic modules.

* * * * *